US012431255B2

(12) United States Patent
Sage et al.

(10) Patent No.: US 12,431,255 B2
(45) Date of Patent: Sep. 30, 2025

(54) METHODS AND APPARATUSES FOR TRAP-DOOR LOADING

(71) Applicant: IonQ, Inc., College Park, MD (US)

(72) Inventors: Jeremy Matthew Sage, Acton, MA (US); Michael Lurie Goldman, University Park, MD (US)

(73) Assignee: IonQ, Inc., College Park, MD (US)

( * ) Notice: Subject to any disclaimer, the term of this patent is extended or adjusted under 35 U.S.C. 154(b) by 707 days.

(21) Appl. No.: 17/865,138

(22) Filed: Jul. 14, 2022

(65) Prior Publication Data

US 2023/0018922 A1 Jan. 19, 2023

Related U.S. Application Data

(60) Provisional application No. 63/286,846, filed on Dec. 7, 2021, provisional application No. 63/222,765, filed on Jul. 16, 2021.

(51) Int. Cl.
*G06N 10/40* (2022.01)
*G21K 1/00* (2006.01)

(52) U.S. Cl.
CPC .............. *G21K 1/003* (2013.01); *G06N 10/40* (2022.01)

(58) Field of Classification Search
USPC ........................................................ 716/100
See application file for complete search history.

(56) References Cited

U.S. PATENT DOCUMENTS 10,733,524 B1 8/2020 Feig et al.
11,797,873 B2 * 10/2023 King ..................... G06E 3/00
2019/0378033 A1 * 12/2019 Figgatt ................. G06N 10/70
2020/0005178 A1 1/2020 Amini
2020/0082291 A1 3/2020 Debnath et al.
2020/0372391 A1 11/2020 Nam et al.
2021/0158200 A1 5/2021 Monroe et al.
(Continued)

FOREIGN PATENT DOCUMENTS

EP 3564872 A1 11/2019

OTHER PUBLICATIONS

Allcock et al., "omg Blueprint for Trapped Ion Quantum Computing With Metastable States", Applied Physics Letters, vol. 119, No. 21, Nov. 22, 2021, 12 pages.
(Continued)

*Primary Examiner* — Brian Ngo
(74) *Attorney, Agent, or Firm* — ARENTFOX SCHIFF LLP

(57) ABSTRACT

Aspects of the present disclosure may include a method and/or a system for trap-door loading including pumping at least one qubit ion from a first manifold of a first plurality of manifolds to a second manifold of the first plurality of manifolds, drive the at least one qubit ion via a partial clock transition from the second manifold of the first plurality of manifolds to a third manifold of a second plurality of manifolds, applying one or more Raman pulses to transfer the at least one qubit ion from the third manifold of the second plurality of manifolds to a fourth manifold of the second plurality of manifolds, flushing the at least one qubit ion using a high-fidelity pumping back to the first plurality of manifolds, and illuminating the first plurality of manifolds for verification.

20 Claims, 19 Drawing Sheets

(56) References Cited

U.S. PATENT DOCUMENTS

2021/0272005 A1 9/2021 King et al.
2022/0261682 A1 8/2022 Calderbank et al.

OTHER PUBLICATIONS

Barreto et al., "Three-laser Coherent Population Trapping In a Multi-lambda System: Theory, Experiment and Applications", Available online at: <https://arxiv.org/pdf/2206.12305v1>, Jun. 24, 2022, 11 pages.

Egan L. N., "Scaling Quantum Computers with Long Chains of Trapped Ions", Available online at: <https://iontrap. umd.edu/wp-content/uploads/2021/06/Egan_Thesis_Final.pdf>, 2021, 239 pages.

Hannegan et al., "Entanglement between a trapped ion qubit and a 780-nm photon via quantum frequency conversion", Available online at: <https://arxiv.org/pdf/2207.13680>, Jul. 27, 2022, 10 pages.

International Search Report and Written Opinion received for PCT Patent Application No. PCT/US2023/034954, mailed on Aug. 26, 2024, 12 pages.

Leroux et al., "Non-abelian Adiabatic Geometric Transformations in a Cold Strontium Gas", Available online at: <https://arxiv.org/pdf/1802.08418v1>, Feb. 23, 2018, 8 pages.

Li et al., "Robust Polarization Gradient Cooling of Trapped Ions", New Journal of Physics, vol. 24, No. 4, Apr. 21, 2022, 10 pages.

Bruzewicz et al., "Dual-species, multi-qubit logic primitives for Ca+/Sr+ trapped-ion crystals," NPJ Quantum Information, 2019, vol. 5, No. 102, 10 pages.

Eschner et al., "Laser cooling of trapped ions," Journal of the Optical Society of America B, May 2003, vol. 20, No. 5, pp. 1003-1015.

Hughes et al., "Benchmarking a high-fidelity mixed-species entangling gate," Physical Review Letters, Aug. 3, 2020, vol. 125, No. 080504, 7 pages.

Inlek et al., "Multi-Species Trapped Ion Node for Quantum Networking," Physical Review Letters, Jun. 23, 2017, vol. 118, No. 250502, 6 pages.

International Search Report in PCT/US2022/033118, mailed Apr. 18, 2023, 5 pages.

Sorensen et al., "Efficient coherent internal state transfer in trapped ions using Stimulated Raman Adiabatic Passage," New Journal of Physics, 2006, vol. 8, No. 261, 11 pages.

Wei et al., "Raman sideband cooling of rubidium atoms in optical lattice," Chinese Physics B, 2017, vol. 26, No. 8, 6 pages.

Wright et al., "Scalable Quantum Computing Architecture with Mixed Species Ion Chains," arXiv:1410.0037v1 [quant-ph], Sep. 30, 2014. Retrieved from the Internet <URL:https://arxiv.org/abs/1410.0037>, 7 pages.

Written Opinion in PCT/US2022/033118, mailed Apr. 18, 2023, 11 pages.

Zi et al., "Injection locking method for Raman beams in atom interferometer," 2017 Asia Communications and Photonics Conference (ACP), Nov. 10, 2017, 2 pages.

* cited by examiner

METHODS AND APPARATUSES FOR TRAP-DOOR LOADING

CROSS REFERENCE TO RELATED APPLICATIONS

This application claims priority to, and the benefit of, U.S. Patent Provisional Application No. 63/222,765, filed Jul. 16, 2021, and U.S. Patent Provisional Application No. 63/286,846, filed Dec. 7, 2021, the entire contents of each of which are hereby incorporated by reference.

TECHNICAL FIELD

Aspects of the present disclosure relate generally to quantum information processing (QIP) architectures, and more particularly, to dual-space, single-species architecture for trapped-ion QIP.

BACKGROUND

Trapped atoms are one of the leading implementations for quantum information processing or quantum computing. Atomic-based qubits can be used as quantum memories, as quantum gates in quantum computers and simulators, and can act as nodes for quantum communication networks. Qubits based on trapped atomic ions enjoy a rare combination of attributes. For example, qubits based on trapped atomic ions have very good coherence properties, can be prepared and measured with nearly 100% efficiency, and are readily entangled with each other by modulating their Coulomb interaction with suitable external control fields such as optical or microwave fields. These attributes make atomic-based qubits attractive for extended quantum operations such as quantum computations or quantum simulations.

It is therefore important to have architectures that take advantage of atomic-based qubits, including architectures that support different types of trapped-ion techniques.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure relate generally to systems and methods for use in the implementation and/or operation of quantum information processing (QIP) systems, and more particularly, to implement trap-door readout. Aspects of the present disclosure includes pumping at least one ancilla ion from a first manifold to a second manifold via Raman transitions, and applying a global clock beam to the at least one ancilla ion to transfer the at least one ancilla ion from the second manifold to a third manifold.

Aspects of the present disclosure relate generally to systems and methods for use in the implementation and/or operation of quantum information processing (QIP) systems, and more particularly, to implement trap-door loading. Aspects of the present disclosure includes pumping at least one qubit ion from a first manifold to a second manifold, drive the at least one qubit ion via a partial clock transition to a third manifold, applying one or more Raman pulses to transfer the at least one qubit ion to a fourth manifold, flush the at least one qubit ion using a high-fidelity pumping, and illuminating a plurality of manifolds for verification.

Aspects of the present disclosure may include a method and/or a system for trap-door loading including pumping at least one qubit ion from a first manifold of a first plurality of manifolds to a second manifold of the first plurality of manifolds, drive the at least one qubit ion via a partial clock transition from the second manifold of the first plurality of manifolds to a third manifold of a second plurality of manifolds, applying one or more Raman pulses to transfer the at least one qubit ion from the third manifold of the second plurality of manifolds to a fourth manifold of the second plurality of manifolds, flushing the at least one qubit ion using a high-fidelity pumping back to the first plurality of manifolds, and illuminating the first plurality of manifolds for verification.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
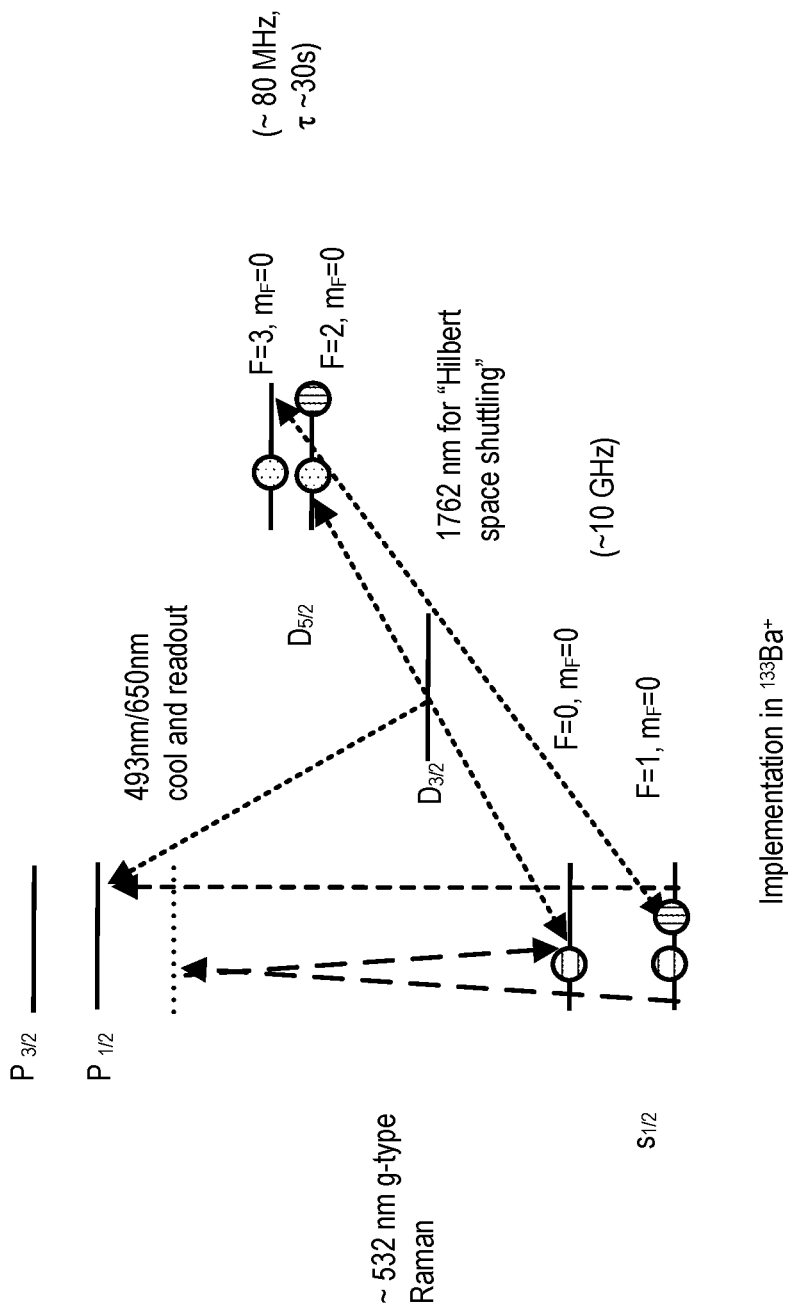
FIG. 1 illustrates an example of a dual-space, single species implementation in 133Ba+ in connection with aspects of this disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

In general, dual-species trapped-ion quantum computing is considered advantageous for practical, high-fidelity systems. This approach can be used to mitigate decoherence of data and syndrome qubits during sympathetic cooling in the middle of long algorithms and/or after ion transport, mid-algorithm qubit readout of a subset of the quantum processor, mid-algorithm remote entanglement generation (REG), and mid-algorithm calibration. This approach relies on having different species with very different transition frequencies. These differences need to be large compared with transition linewidths and transition rates.

But the use of dual-species in trapped-ion quantum computing can have some challenges. For example, more lasers and optical beams are needed, chain (e.g., linear arrangement of ions) order matters both for ion addressability and mode structure, and more complicated loading, and unintended chain reordering may cause some issues. Moreover, sympathetic cooling in mixed species chains (especially radial modes) can be inefficient, while shuttling and split/merge operations in mixed species chains is challenging due to different pseudopotentials seen by ions of different mass. Mixed-species two-qubit (2q) gates (needed for REG distribution) can have lower fidelity.

The Dual-Space Concept

The dual-space concept is described in connection with FIG. 1. For this approach, there is the use of two Hilbert spaces in one ion species to gain dual-species functionality. These spaces are naturally decoupled but can be coupled through application of optical fields. Spaces either consist of ground state or metastable state.

This approach is sometimes referred to as the "omg" or "OMG" concept because it involves an optical qubit (i.e., o-type, shown as a circle with vertical lines in FIG. 1) for high-fi measurement, a metastable qubit (i.e., m-type, shown as a circle with dots in FIG. 1) for protected memory with low-field clock states, T1~30 s, and a ground qubit (i.e., g-type, shown as a circle with horizontal lines in FIG. 1) for processing, cooling, and remote entanglement generation. This approach involves arrow quadrupole transitions for changing types: "Hilbert space shuttling" (HSS).

Sympathetic Cooling

In a trapped-ion quantum computer, the collective motional modes of a chain of ions must be cooled to enable high-fidelity manipulation of the atomic qubits. However, during a calculation, electric field noise leads to heating of these motional modes, which can degrade the system's performance over the course of the calculation. Additionally, to perform a calculation that involves ions in multiple chains, the chains must be shuttled spatially during the calculation, which can also lead to heating of the motional modes. Sympathetic cooling is typically used to cool these motional modes during a calculation. This involves performing the calculation using one set of "qubit" ions while simultaneously performing laser-cooling operations on a separate set of "coolant" ions, which has the effect of cooling the collective motional modes of the entire chain. This has been demonstrated by using two separate elements (e.g., Yb and Ba) or two isotopes of the same element (e.g., Yb-171 and Yb-172) for the qubit and coolant ions.

However, one problem is that the coupling of individual ions to the collective motional modes depends on those ions' masses, and so ions that have different masses—as different elements or isotopes do—couple differently to the motional modes, degrading the effectiveness of the sympathetic cooling scheme. Further, the presence of ions with different masses complicates the design of quantum gates, which are highly sensitive to properties of the collective motional modes. A second significant technical problem is that collision with background gas molecules can cause the ions in the chain to reorder, scrambling the qubit and coolant ions and forcing the slow and costly operation of either re-ordering or rebuilding the chain. A third problem, for chains composed of two isotopes of the same element, is that the frequencies of the optical transitions involved in cooling the coolant ions are typically close to those of the qubit ions, and so light that is emitted by the coolant ions can be absorbed by the qubit ions, degrading the calculation.

There are some of the advantages to the approach described herein in connection with sympathetic cooling. Because the qubit and coolant ions are identical, the problems related to different masses and chain reordering are eliminated. Further, because all ions in the chain are identical until they are assigned to be either qubit or coolant ions, the assignment can be determined dynamically for each calculation to optimize the number and positions of coolant ions without reloading a new chain.

High-Fidelity Readout

At the end of a computation the states of all qubit ions must be read out optically. Generally, this is done by applying a global detection laser, which will cause ions that are in the "bright" state to fluoresce but not ions that are in the "dark" state. Because the bright and dark states for a hyperfine qubit are generally part of the same manifold (i.e., the $S_{1/2}$ states in $^{133}Ba^+$ or $^{171}Yb$), the transition(s) addressed by the detection laser must be chosen carefully to avoid exciting the ion out of the dark state, thereby leading to erroneous fluorescence, and also to avoid pumping the ion from the bright state to the dark state, thereby leading to an erroneous lack of fluorescence. Often, the rates at which these errors occur are set by the intrinsic atomic properties of the ion, placing a fundamental limit on the fidelity with which the ion's state can be read out.

There are various advantages to the approach described herein in connection with the read out. For example, these errors can be avoided by transferring one of the qubit states into a separate manifold (i.e., the $D_{5/2}$ states in $^{133}Ba^+$), a process known as shelving. The ion can then be illuminated in such a way so that all states in the original manifold fluoresce. Because the two manifolds are decoupled, the rate at which the dark state (the state that has been shelved) can be caused to erroneously fluoresce and the rate at which the bright state (the state that has not been shelved) can erroneously stop fluorescing are extremely small. As a result, the readout fidelity can be made to be extremely high.

Mid-Circuit Calibration

The fidelity of a quantum computation is extremely sensitive to a wide variety of experimental factors, such as optical beam alignment, laser intensity at the ions, the strength of the confining potential that traps the ions, the presence of stray electric fields, and many others. These factors are likely to drift or change over time, so calibrations need to be performed to account for this drift.

Because these calibrations require reading the states of the ions to extract information about these factors, they are typically performed between computations, during which it is forbidden to read the states of the qubit ions involved in the computation. However, this limits the speed at which these calibrations can be performed, limiting the bandwidth of the calibration feedback.

Alternatively, calibrations can be performed during the computation using ancilla ions that are not involved in the computation itself. However, because these calibration routines collect fluorescence from the ancilla ions to read out their states, it has formerly been required to use either a different atomic element or different isotope for the ancilla ions so that this fluorescence does not disturb the states of the qubit ions that are involved in the computation. Consequently, various properties of the ancilla ions may be different from those of the qubit ions, which causes them to be influenced by these experimental factors in subtly different ways and may limit the predictive value of ancilla-based calibrations.

There are various advantages to the approach described herein in connection with mid-circuit calibration. For example, the ancilla and qubit ions are identical, and the calibration routines are performed by precisely the same techniques that are used to run the computation. Therefore, the calibration results do not need to be adjusted to account for physical differences between the calibration routines run on the ancilla ions and the computation run on the qubit ions.

Mid-Circuit Partial Readout

Many quantum algorithms or circuits involve measuring a fraction of the qubits mid-circuit while requiring that the unmeasured fraction remain coherent. Such mid-circuit measurement can be a critical component of quantum error correction (QEC). In QEC, ancilla qubits, which are entangled with data qubits, are measured to herald and identify errors in the data qubits. The error in the data qubits can then be corrected by subsequent quantum operations, but this only works if the quantum information in the data qubits is not destroyed during the measurement of the ancillas. This presents a challenge for single-species trapped-ion-qubit systems because measurement of ancillas typically requires the scattering of many photons from a readout laser, and these photons can be reabsorbed by nearby data ions causing their quantum information to be lost. One standard approach to solve this problem is to move the ancilla ions far away from the data ions after they are entangled with them, but before (and during) measurement. However, this dynamic, mid-circuit reconfiguration of ion-qubit positions can be impractical or undesirable in many situations. The use of dual-species trapped-ion systems, where ancillas and data ions are different species, also mitigates this problem and allows ions to stay close to one another. However, the disadvantages of dual species operation have already been elucidated earlier. In this mid-circuit partial readout protocol for QEC, dual-species entangling (two-qubit) gates may be required, which may typically have a fidelity that is not as good as that of single-species entangling gates.

There are various advantages to the approach described herein in connection with mid-circuit partial readout. For example, data qubits can be stored in the m-type space while ancillas are measured. This protects the quantum information in the data qubits from absorption of photons emitted from nearby ancilla qubits. As a result, there is no decoherence from this measurement process and mid-circuit partial readout of the ion register can be performed without any constraints on the distance between data and ancilla ion qubits. Furthermore, only a single species ion is used, so entangling gates between data and ancilla ions will typically be of higher fidelity.

Mid-Circuit Remote Entanglement Generation

Ion-based quantum computers will need to scale to numbers of qubits that are larger than can be worked with in a single trap. A technique called "remote entanglement generation" (REG) may be required to enable communication between the registers of ions held in separate traps. A common method of remote entanglement generation involves combining single photons emitted by "ancilla" ions in separate traps onto a beamsplitter and measuring the output of that beamsplitter. During the process of REG, ancilla ions are typically kept in the g-type space and emit many photons, only a small fraction of which can be typically collected and used in the beamsplitter interference protocol mentioned above. The remainder of these photons are scattered in all directions and can be reabsorbed by neighboring quantum data ions that are also in the g-type space. If these neighboring data ions have quantum information in them (as would be the case for REG attempted in the middle of a quantum algorithm as might often be desirable), this information will be lost. If all ions are in the g-type space (which is the standard approach), REG cannot be carried out without suffering decoherence or without keeping the ancilla ions very far away from the data ions (the latter of which is not practical or desirable in many situations). The use of dual-species trapped-ion systems, where ancillas and data ions are different species, also mitigates this problem and allows ions to stay close to one another. However, the disadvantages of dual-species operation have already been elucidated earlier. In mid-circuit REG using dual-species, entangling (two-qubit) gates would be required to distribute the quantum information around the quantum register, and such dual-species gates typically have worse fidelity than single-species entangling gates.

There are various advantages to the approach described herein in connection with mid-circuit remote entanglement generation. For example, it is possible to protect the neighboring ions in the m-type space during REG, as the m-type ions cannot absorb photons emitted from g-type ions. As a result, REG can be performed in the middle of a quantum circuit using REG ancilla ions without causing decoherence of nearby quantum data ions. Furthermore, in our approach, only a single species ion is used, so entangling gates between data and ancilla ions will typically be higher fidelity.

Advantages of Dual Spaces Over Dual Species

The advantages of dual spaces over dual species are described, at least partially, in connection with FIG. 1. For example, using the dual-space approach, m-type qubits are protected from stray control or scattered light in entropic operations (e.g., sympathetic Doppler, EIT cooling, REG) in neighbors. The dual-space approach enables mid-circuit cooling, calibration, readout, REG. The use of one species means fewer lasers and optical paths, standard, efficient sympathetic cooling, more straightforward shuttling, chain reordering accomplished via HSS (dynamic reconfigurability of the chain with lasers), and RE distribution accomplished via HSS and not a mixed-species two-qubit (2q) gate.

Two Classes of Features: CLASS I—Qubits Plus Coolant/Calibration Ions

Figure 2:
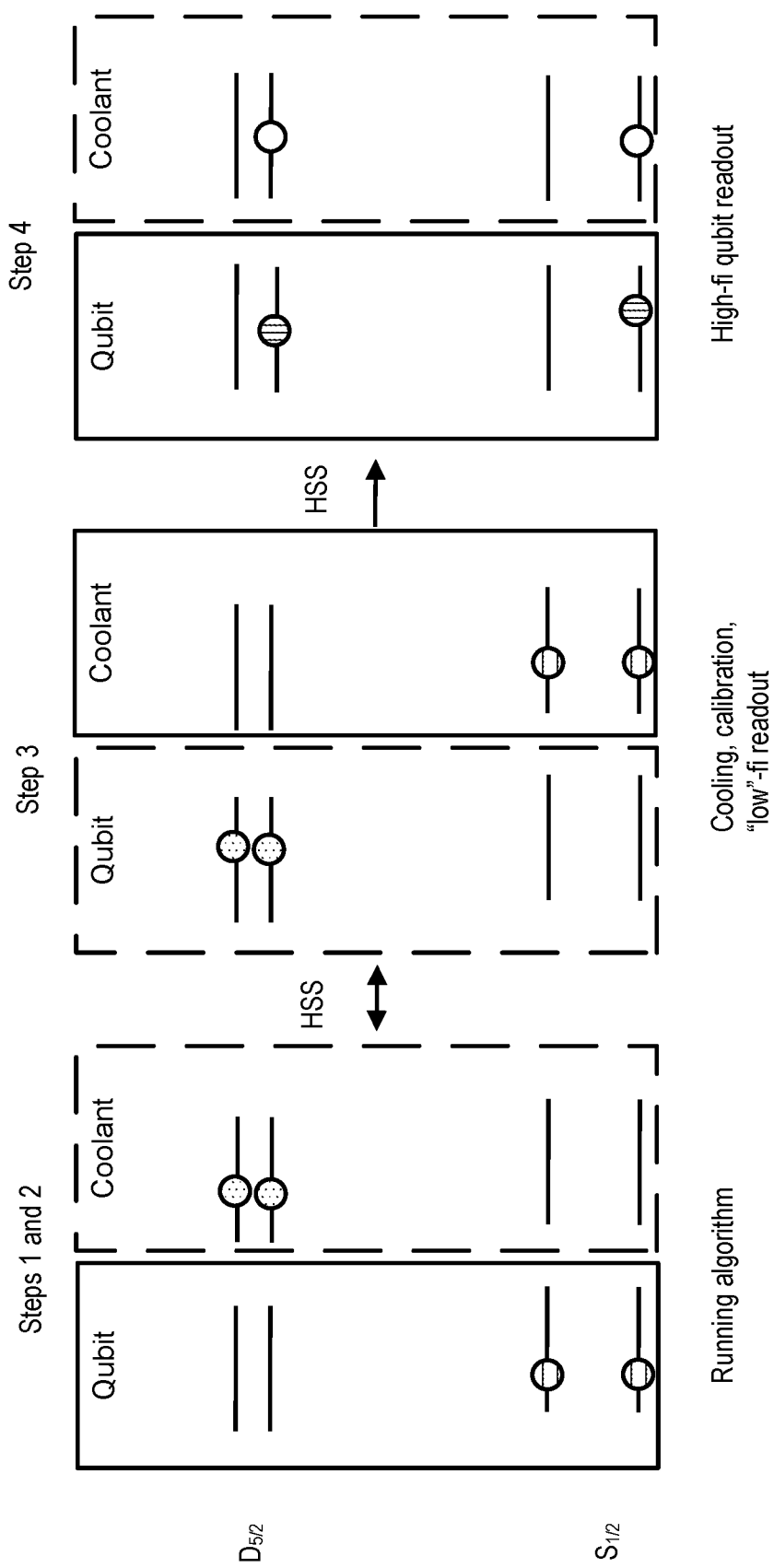
FIG. 2 illustrates a first class of features related to qubits plus coolant/calibration ions in connection with aspects of this disclosure.

The first class of features, CLASS I, is described in connection with FIG. 2. In connection with CLASS I the following scheme can be performed (as illustrated in FIG. 2):

(1) Initialize: Separate qubits and coolant ions into g (e.g., $S_{1/2}$ in $^{133}Ba^+$ and m (e.g., $D_{5/2}$) manifolds. Transfer only coolant ions to m manifold.
(2) Perform part of algorithm on g-type qubits.
(3) Mid-algorithm, flip-flop (HSS) all ions between g and m manifolds, with qubits and coolant ions in opposite manifolds at all times. The g-type has Raman, laser cooling, low-fidelity readout, pumping. The m-type has storage. Repeat 2-3 until the algorithm completes.
(4) Transfer qubits to o-type for high-fidelity readout.

The use of CLASS I enables: (1) Sympathetic cooling of any flavor with perfect mass-matching, coolant ion placement reconfigurable on a per-circuit basis without physical shuttling, and (2) mid-circuit calibration routines on coolant ions that have hyperfine qubit states identical to those of the qubits.

Two Classes of Features: CLASS II—Qubits Plus Ancillas Plus Coolant Ions

Figure 3:
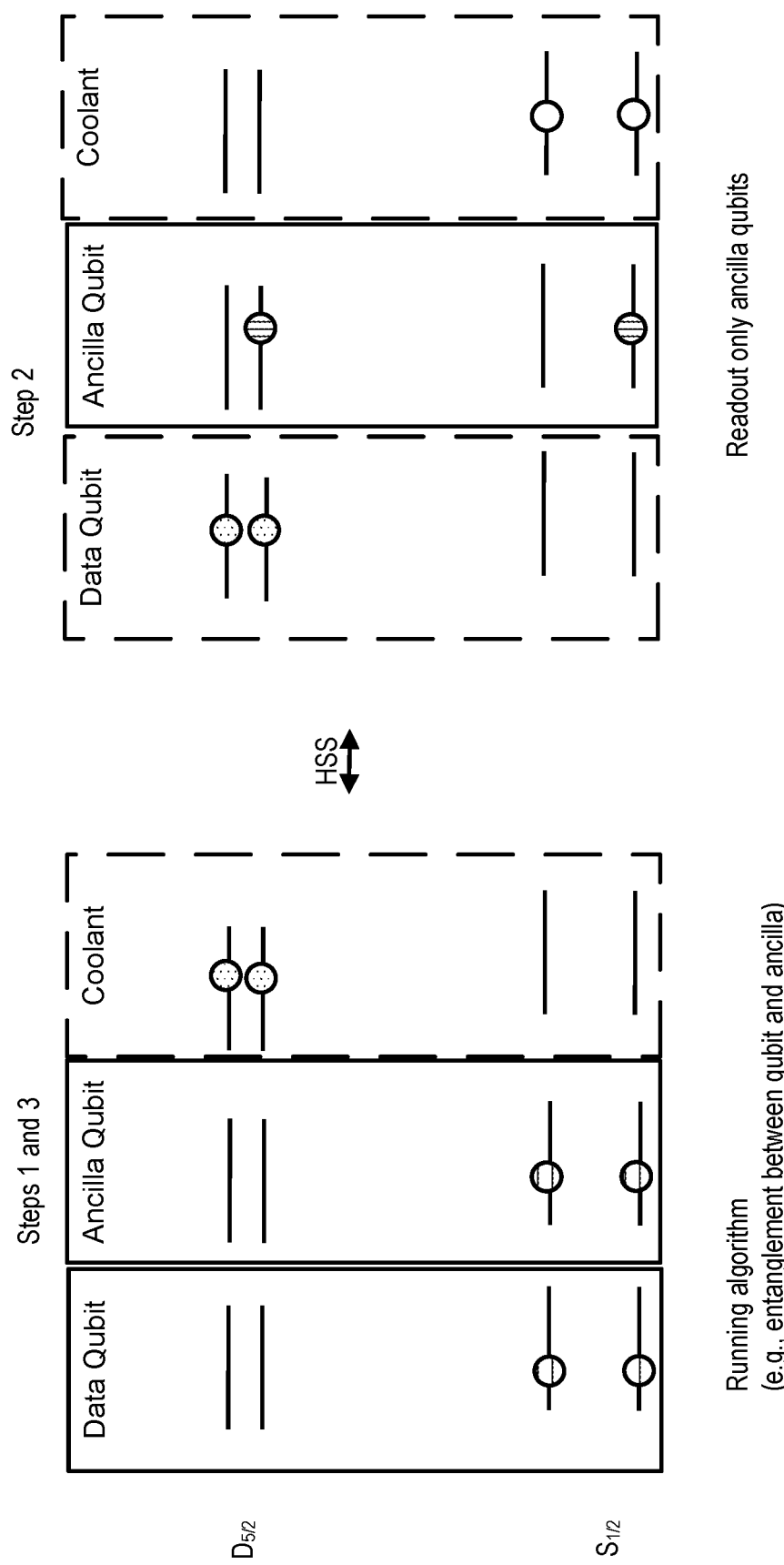
FIG. 3 illustrates a second class of features related to qubits plus ancillas plus coolant ions in connection with aspects of this disclosure.

The second class of features, CLASS II, is described in connection with FIG. 3. In connection with CLASS II the following scheme can be performed (as illustrated in FIG. 3):

(1) Perform partial algorithm with data qubits and ancillas in g-type.
(2) Transfer only ancillas to o-type and data to m-type via HSS and hi-fidelity readout of ancillas.
(3) Move ancilla qubits back to qubit manifold and continue circuit.
(4) Sympathetic cooling/calibration can also be interspersed at any time (See Classes I and II).

CLASS II functions require more HSS than CLASS I, but both need ONLY local g-type Raman and global HSS, cooling, and readout.

The use of CLASS II enables: (1) Mid-circuit partial high-fi readout of quantum register without physical shuttling, and (2) mid-circuit REG without physical shuttling (not depicted).

Example (A) Sympathetic Cooling/Calibration

Figure 4:
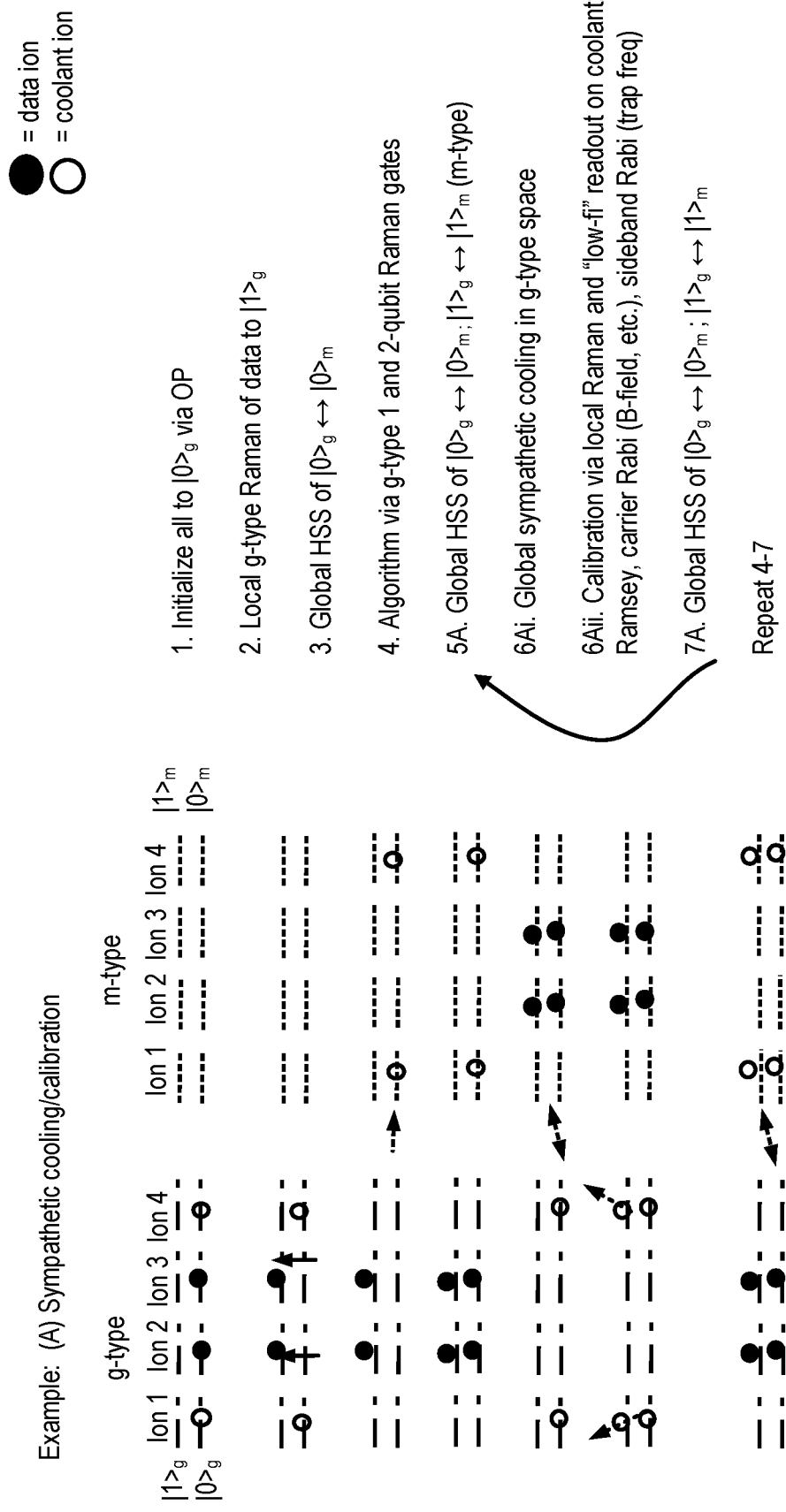
FIG. 4 illustrates an example of sympathetic cooling/calibration in connection with aspects of this disclosure.

An example of sympathetic cooling/calibration is described in connection with FIG. 4. In connection with FIG. 4 the following scheme can be performed (which follows the diagrammatic flow in FIG. 4 from top to bottom):

(1) Initialize all to $|0>_g$ via optical pumping (OP).
(2) Local g-type Raman of data to $|1>_g$.
(3) Global HSS of $|0>_g \leftrightarrow |0>_m$.
(4) Algorithm via g-type 1 and 2-qubit Raman gates.
(5A) Global HSS of $|0>_g \leftrightarrow |0>_m$; $|1>_g \leftrightarrow |1>_m$ (m-type).
(6Ai) Global sympathetic cooling in g-type space.
(6Aii) Calibration via local Raman and "low-fi" or low-fidelity readout on coolant: Ramsey, carrier Rabi (B-field, etc.), sideband Rabi (trap frequency).
(7A) Global HSS of $|0>_g \leftrightarrow |0>_m$; $|1>_g \leftrightarrow |1>_m$.
Repeat 4-7.

Example (A-Alternative) Sympathetic Cooling/Calibration

Figure 5:
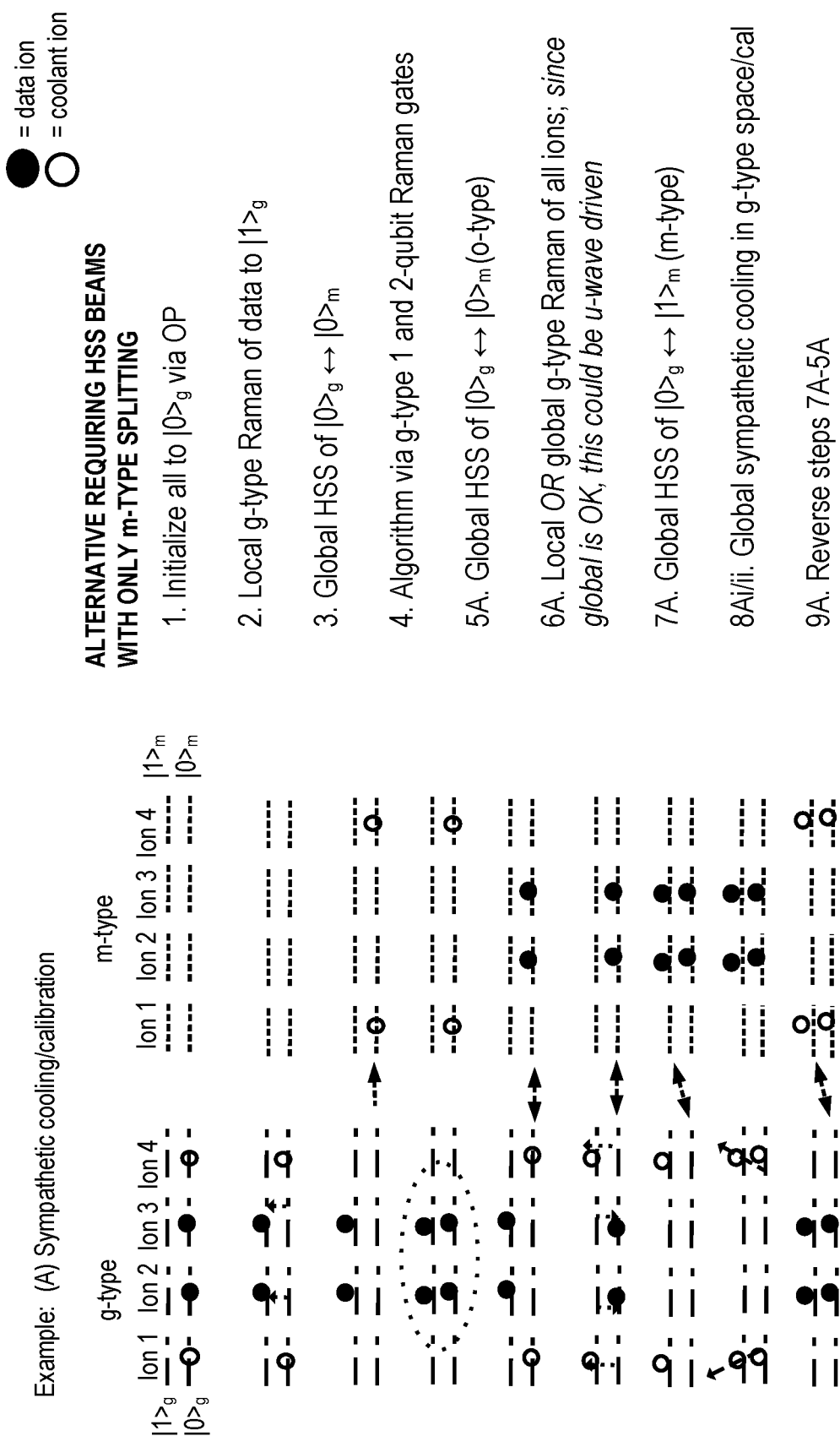
FIG. 5 illustrates an example of an alternative sympathetic cooling/calibration in connection with aspects of this disclosure.

An example of an alternative sympathetic cooling/calibration requiring HSS beam with only m-type splitting is described in connection with FIG. 5. In connection with FIG. 5 the following scheme can be performed (which follows the diagrammatic flow in FIG. 5 from top to bottom):

(1) Initialize all to $|0>_g$ via OP.
(2) Local g-type Raman of data to $|1>_g$.
(3) Global HSS of $|0>_g \leftrightarrow |0>_m$.
(4) Algorithm via g-type 1 and 2-qubit Raman gates.
(5A) Global HSS of $|0>_g \leftrightarrow |0>_m$ (o-type).
(6A) Local OR global g-type Raman of all ions; since global is OK, this could be u-wave driven.
(7A) Global HSS of $|0>_g \leftrightarrow |1>_m$ (m-type).
(8Ai/ii) Global sympathetic cooling in g-type space/cal.
(9A) Reverse steps 7A-5A.

Example (B) Ancilla Readout

Figure 6:
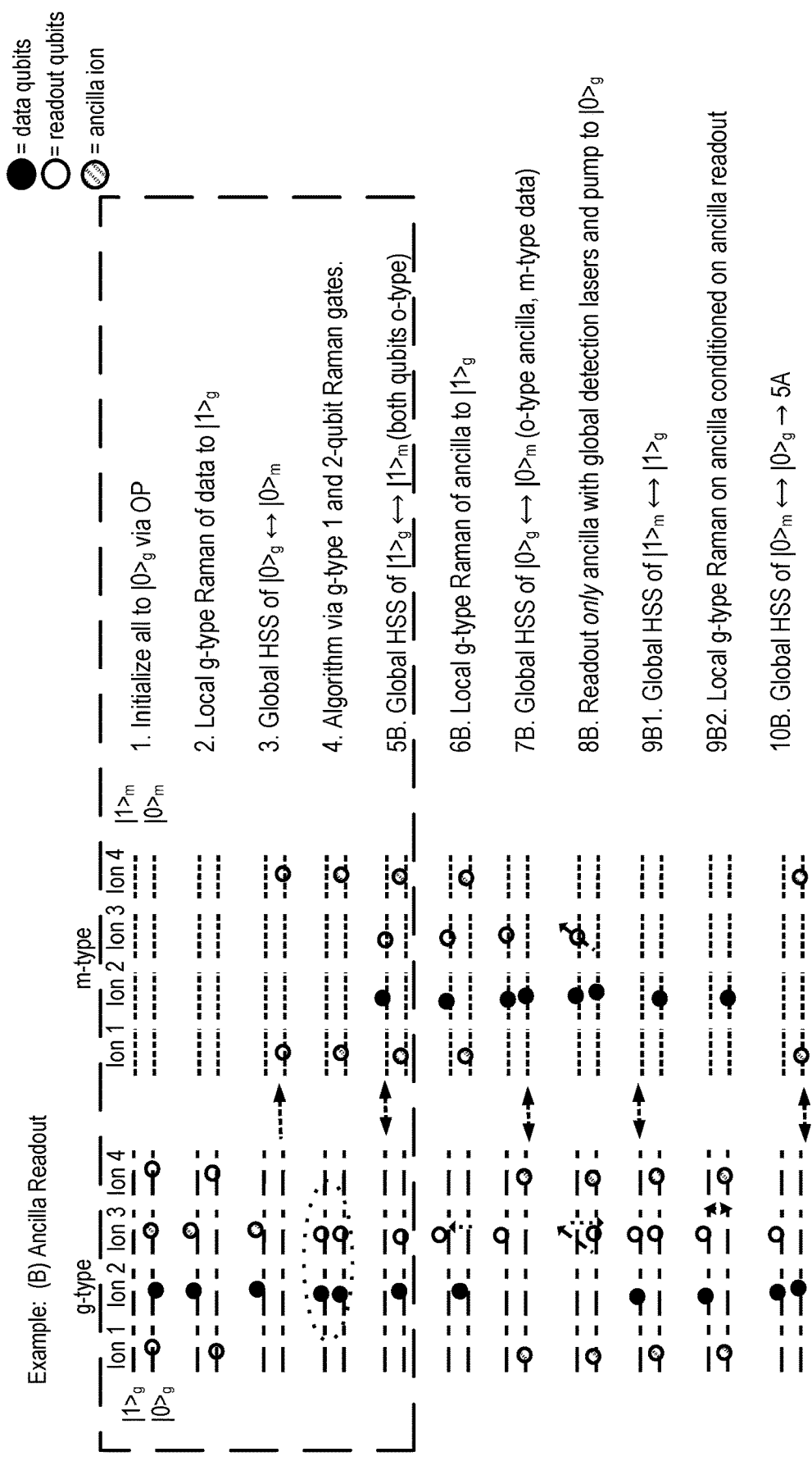
FIG. 6 illustrates an example of an ancilla readout in connection with aspects of this disclosure.

An example of an ancilla readout is described in connection with FIG. 6. In connection with FIG. 6 the following scheme can be performed (which follows the diagrammatic flow in FIG. 6 from top to bottom):

(1) Initialize all to $|0>_g$ via OP.
(2) Local g-type Raman of data to $|1>_g$.
(3) Global HSS of $|0>_g \leftrightarrow |0>_m$.
(4) Algorithm via g-type 1 and 2-qubit Raman gates.
(5B) Global HSS of $|1>_g \leftrightarrow |1>_m$ (both qubits o-type).
(6B) Local g-type Raman of ancilla to $|1>_g$.

(7B) Global HSS of $|0\rangle_g \leftrightarrows |0\rangle_m$ (o-type ancilla, m-type data).
(8B) Readout only ancilla with global detection lasers and pump to $|0\rangle_g$.
(9B1) Global HSS of $|1\rangle_m \leftrightarrows |1\rangle_g$.
(9B2) Local g-type Raman on ancilla conditioned on ancilla readout.
(10B) Global HSS of $|0\rangle_m \leftrightarrows |0\rangle_g \rightarrow$5A.

Example (C) Mid-Algorithm Calibration Via Ancilla

Figure 7:
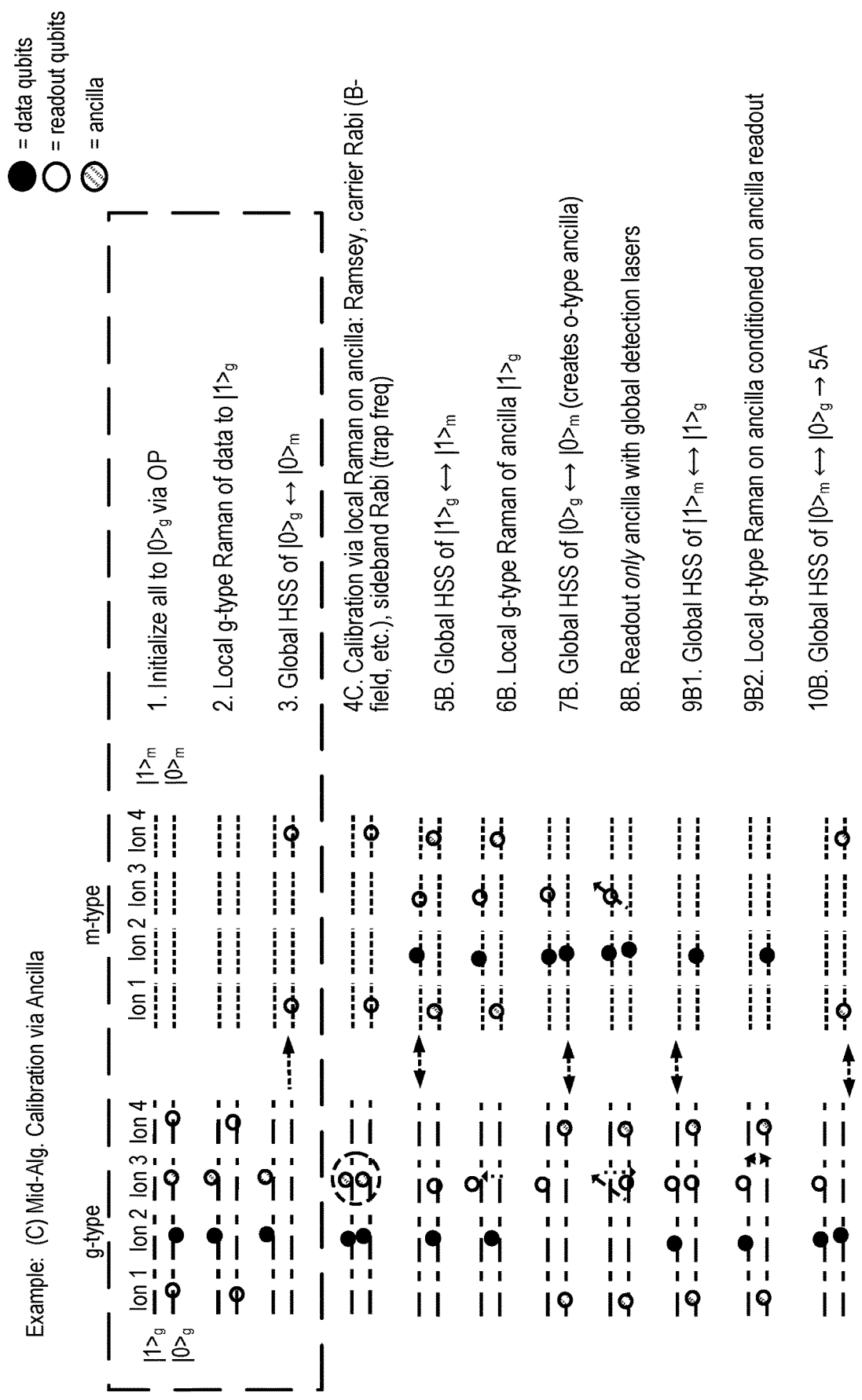
FIG. 7 illustrates an example of mid-algorithm calibration via ancilla readout in connection with aspects of this disclosure.

An example of a mid-algorithm calibration via ancilla is described in connection with FIG. 7. In connection with FIG. 7 the following scheme can be performed (which follows the diagrammatic flow in FIG. 7 from top to bottom):
(1) Initialize all to $|0\rangle_g$ via OP.
(2) Local g-type Raman of data to $|1\rangle_g$.
(3) Global HSS of $|0\rangle_g \leftrightarrows |0\rangle_m$.
(4C) Calibration via local Raman on ancilla: Ramsey, carrier Rabi (B-field, etc.), sideband Rabi (trap frequency).
(5B) Global HSS of $|1\rangle_g \leftrightarrows |1\rangle_m$.
(6B) Local g-type Raman of ancilla $|1\rangle_g$.
(7B) Global HSS of $|0\rangle_g \leftrightarrows |0\rangle_m$ (creates o-type ancilla).
(8B) Readout only ancilla with global detection lasers.
(9B1) Global HSS of $|1\rangle_m \leftrightarrows |1\rangle_g$.
(9B2) Local g-type Raman on ancilla conditioned on ancilla readout.
(10B) Global HSS of $|0\rangle_m \leftrightarrows |0\rangle_g \rightarrow$5A.

Example (D) Reg and Distribution Via Ancilla

Figure 8:
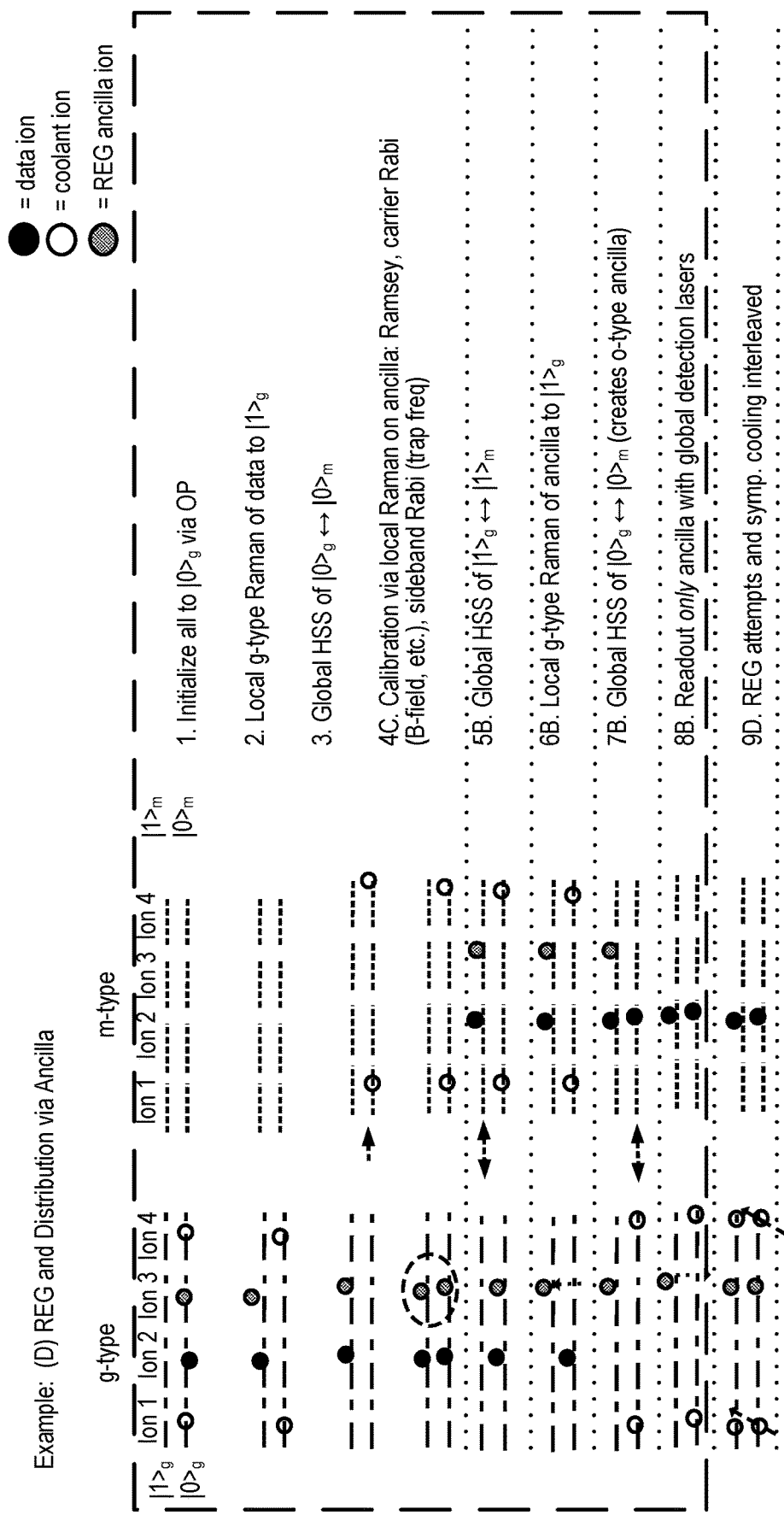
FIGS. 8 and 9 illustrate an example of a REG and distribution via ancilla in connection with aspects of this disclosure.
Figure 9:
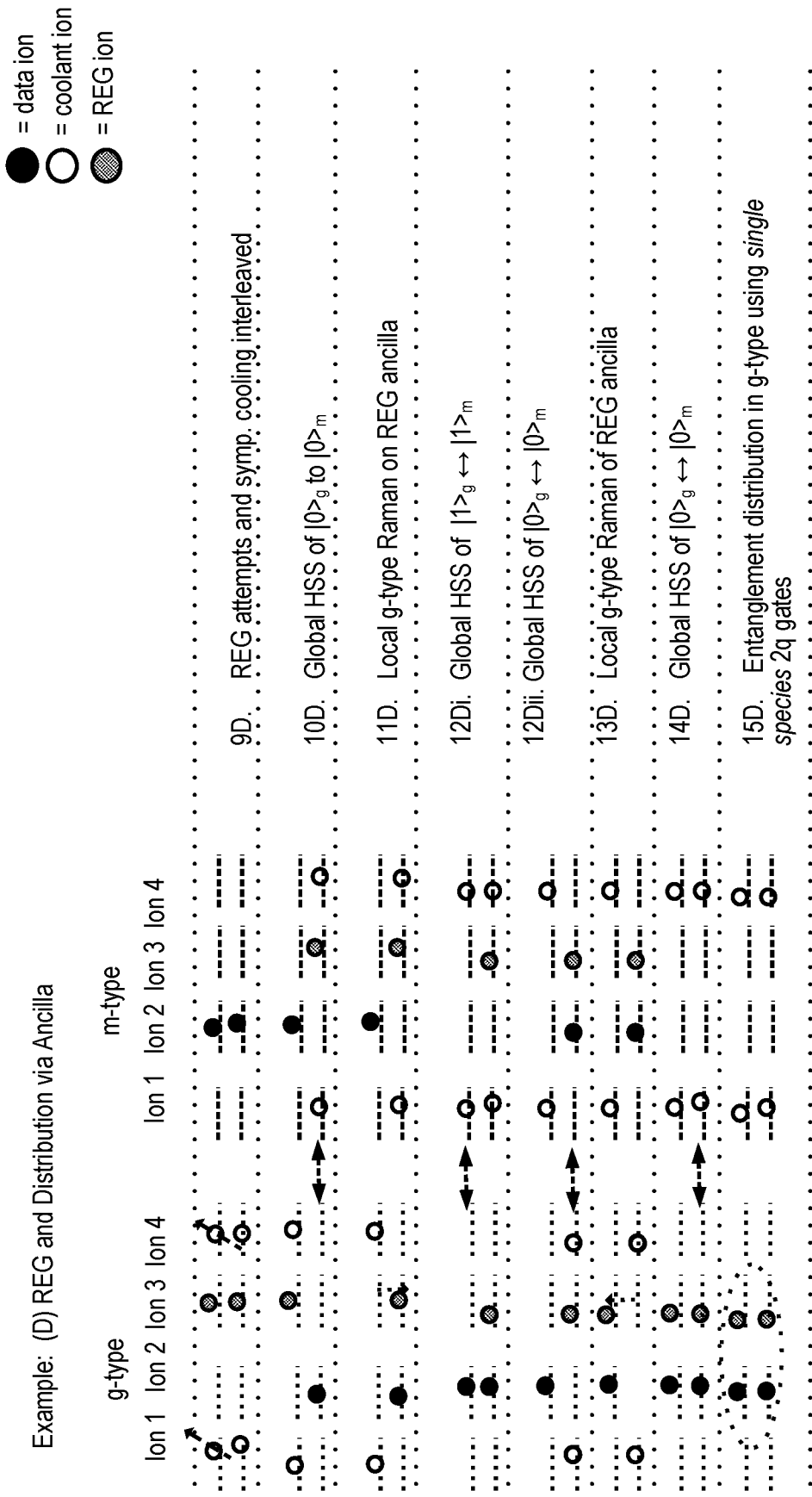

An example of a REG and distribution via ancilla is described in connection with FIGS. 8 and 9. In connection with FIG. 8 the following scheme can be performed (which follows the diagrammatic flow in FIG. 8 from top to bottom):
(1) Initialize all to $|0\rangle_g$ via OP.
(2) Local g-type Raman of data to $|1\rangle_g$.
(3) Global HSS of $|0\rangle_g \leftrightarrows |0\rangle_m$.
(4C) Calibration via local Raman on ancilla: Ramsey, carrier Rabi (B-field, etc.), sideband Rabi (trap frequency).
(5B) Global HSS of $|1\rangle_g \leftrightarrows |1\rangle_m$.
(6B) Local g-type Raman of ancilla $|1\rangle_g$.
(7B) Global HSS of $|0\rangle_g \leftrightarrows |0\rangle_m$ (creates o-type ancilla).
(8B) Readout only ancilla with global detection laser.
(9D) REG attempts and sympathetic cooling interleaved.
In connection with FIG. 9 the scheme described above is continued (by following the diagrammatic flow in FIG. 9 from top to bottom):
Step (9D) is now shown at the top and was last step shown in FIG. 9. (9D) REG attempts and sympathetic cooling interleaved.
(10D) Global HSS of $|0\rangle_g \leftrightarrows |0\rangle_m$
(11D) Local g-type Raman on REG ancilla.
(12Di) Global HSS of $|1\rangle_g \leftrightarrows |1\rangle_m$
(12Dii) Global HSS of $|0\rangle_g \leftrightarrows |0\rangle_m$
(13D) Local g-type Raman on REG ancilla.
(14D) Global HSS of $|0\rangle_g \leftrightarrows |0\rangle_m$ (15D) Entanglement distribution in g-type using single species 2q gates.

Hilbert Space Shuttling (HSS)

In connection with HSS, questions may come up about how good the 1762-nm pulses are. Blatt/Home claim fidelities of $5e^{-5}$ in $^{40}Ca^+$ (729 nm) and others have been able to do $\sim 4e^{-4}$ in $^{88}Sr^+$ (674 nm, GST). One aspect includes potentially using composite pulses to improve. Moreover, the 1762 pulse is likely to be better than 674, 729 pulses due to smaller Debye-Waller factors (DWs). But probably may want to use the global 1762 along radial direction to keep DWs low.

Another possible consideration relates to the 1762 pulse phase. The optical phase gets imprinted on the o-type but gets removed when converting back to g-type as long as laser is coherent over o-type dwell time. For the o-type, coherence times of 10-100 milliseconds (ms) are achievable.

For the m-type, only the phase difference between the $|0\rangle_g \leftrightarrows |0\rangle_m$ and $|1\rangle_g \leftrightarrows |1\rangle_m$ beams matters. One approach is to derive both beams from same laser, minimize path length differences.

Another question that may come up is the AC Stark shifts from global 1762 pulses. For the g-type: $\Delta$=10 GHz gives $\delta_{AC} \sim$25 Hz. For the m-type $\Delta$=80 MHz gives $\delta_{AC} \sim$3 kHz. Only occurs for F=1 to F'=3 beam (F=0 to F'=3 is quadrupole forbidden). Can potentially use spin echo to cancel, or just keep track of the Zgate rotation Yet another question that may come up is the number of 1762 tones/lasers that may be needed. The scheme described above needs independent 1762 tones separated by ~10 GHz. An example of such implementation is described below. A modified version only requires 1762 tones separated by ~80 MHz mid-circuit REG is given up. However, REG is a longer-term goal with other technical challenges to consider.

M-Type Raman Gates

Figure 10:
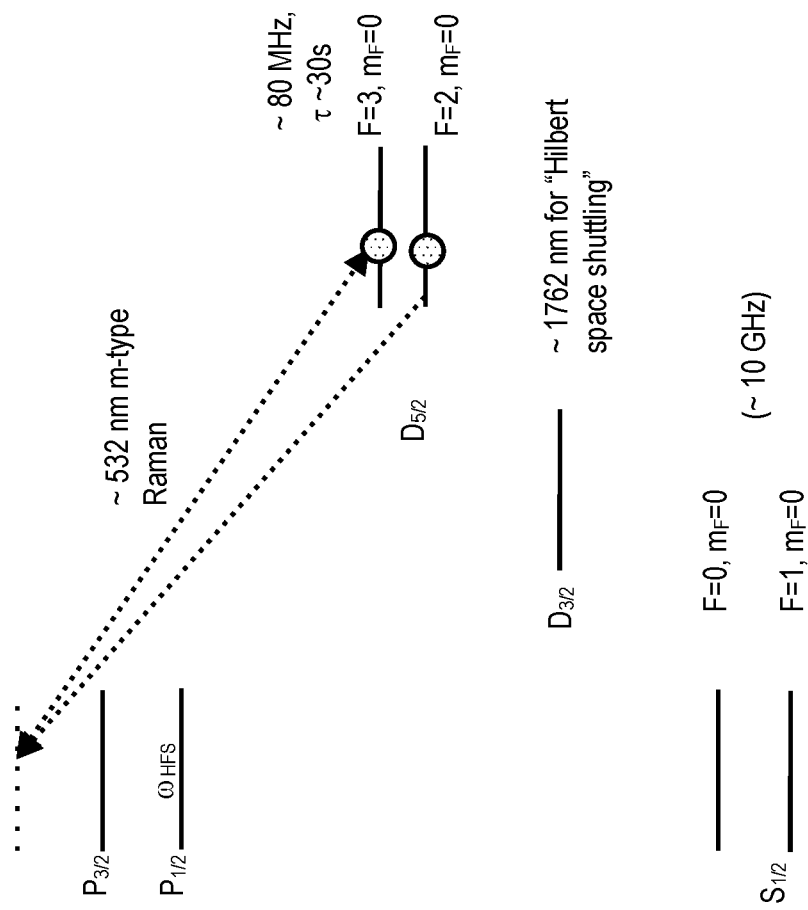
FIG. 10 illustrates an example of m-type Raman gates in connection with aspects of this disclosure.

Other aspects of the present disclosure may include implementing m-type Raman gates. M-type Raman gates may implement the same classes of features as in the g-type Raman scheme as described below. An example of m-type Raman gates is described in connection with FIG. 10. Fundamentally higher-fidelity gates for $^{133}Ba^+$ with Raman laser at 532 nm. $D_{5/2}$ only couples to $P_{3/2}$ so it is possible to get $1/\Delta$ Rabi rate even for $\Delta \gg \omega_{HFS}$. Wins the war against spontaneous emission $(\sim 1/\Delta^2) \rightarrow$——5× error reduction.

This approach is technically simpler, with straightforward CW Raman if desired. CW Raman also can be used for g-type Raman. Can use AOM instead of EOM to span qubit frequency.

In addition, circuit performance is largely insensitive to imperfect HSS. The need for HSS transfers during the computation is either reduced (Class II functions) or eliminated altogether (Class I functions), which significantly reduces the impact of imperfect HSS transfer on the computation fidelity.

Figure 11:
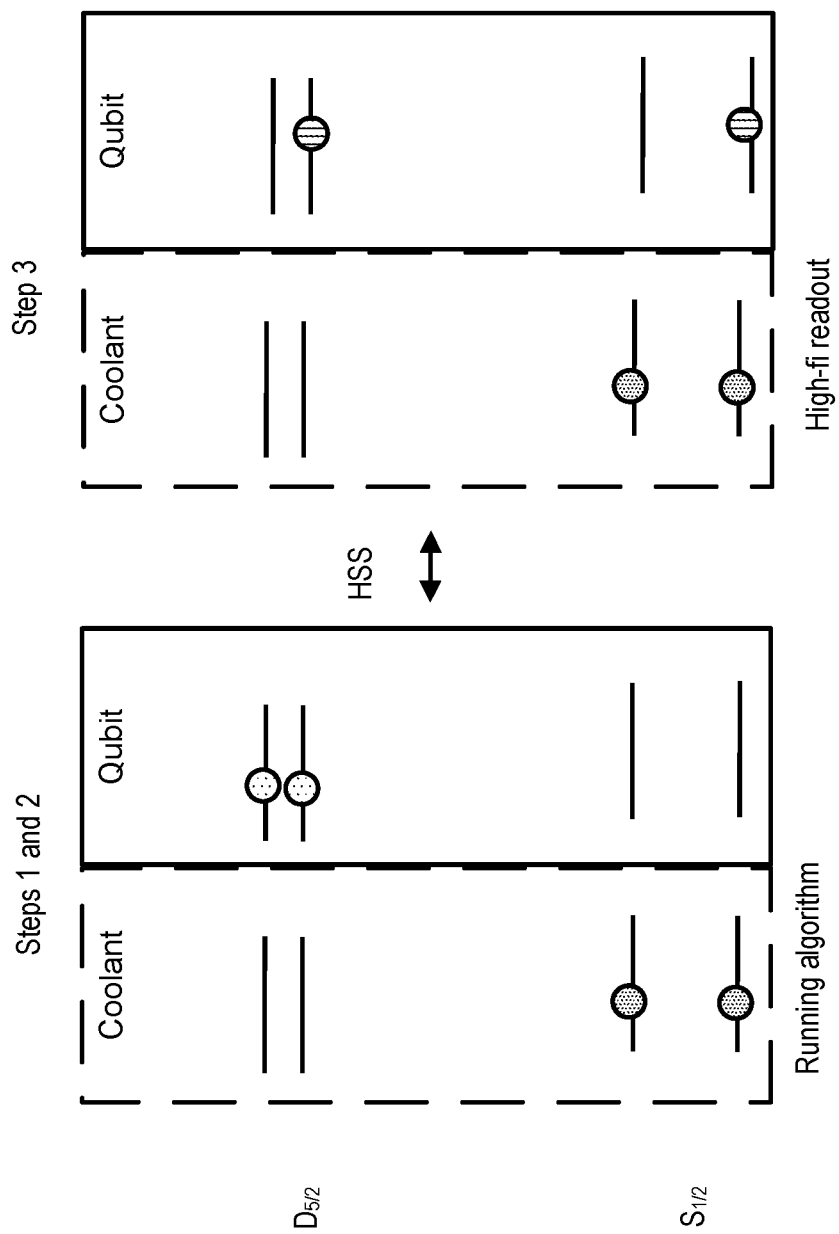
FIG. 11 illustrates a first class of features with m-type Raman related to qubits plus coolant/calibration ions in connection with aspects of this disclosure.

Two Classes of Features with M-Type Raman:
CLASS I—Qubits Plus Coolant/Calibration Ions The first class of features with m-type Raman, CLASS I, is described in connection with FIG. 11 shown below. In connection with CLASS I the following scheme can be performed (as illustrated in FIG. 11):

(1) Initialize: Separate qubits and coolant ions into g ($S_{1/2}$) and m ($D_{5/2}$) manifolds with global HSS. Transfer only qubit ions to m manifold.
(2) Run circuit in m manifold (now has Raman) while interspersing cooling/calibration with ions in g manifold (has Raman, EIT cooling, readout, pumping). No HSS required during circuit/cooling/calibration.
(3) Transfer one qubit state to o-type for high-fidelity readout of qubits with global HSS.

The use of CLASS I enables (without HSS during circuit/cooling/calibration): (1) Sympathetic cooling of any flavor with perfect mass-matching, coolant ion placement reconfigurable on a per-circuit basis without physical shuttling, and (2) Mid-circuit calibration routines on coolant ions that have hyperfine qubit states identical to those of the qubits. The use of CLASS I requires only $|0>_g \leftrightarrows |0>_m$ transitions for HSS, no m-type AC Stark shifts. Also, it requires only m-type Raman, not g-type.

Figure 12:
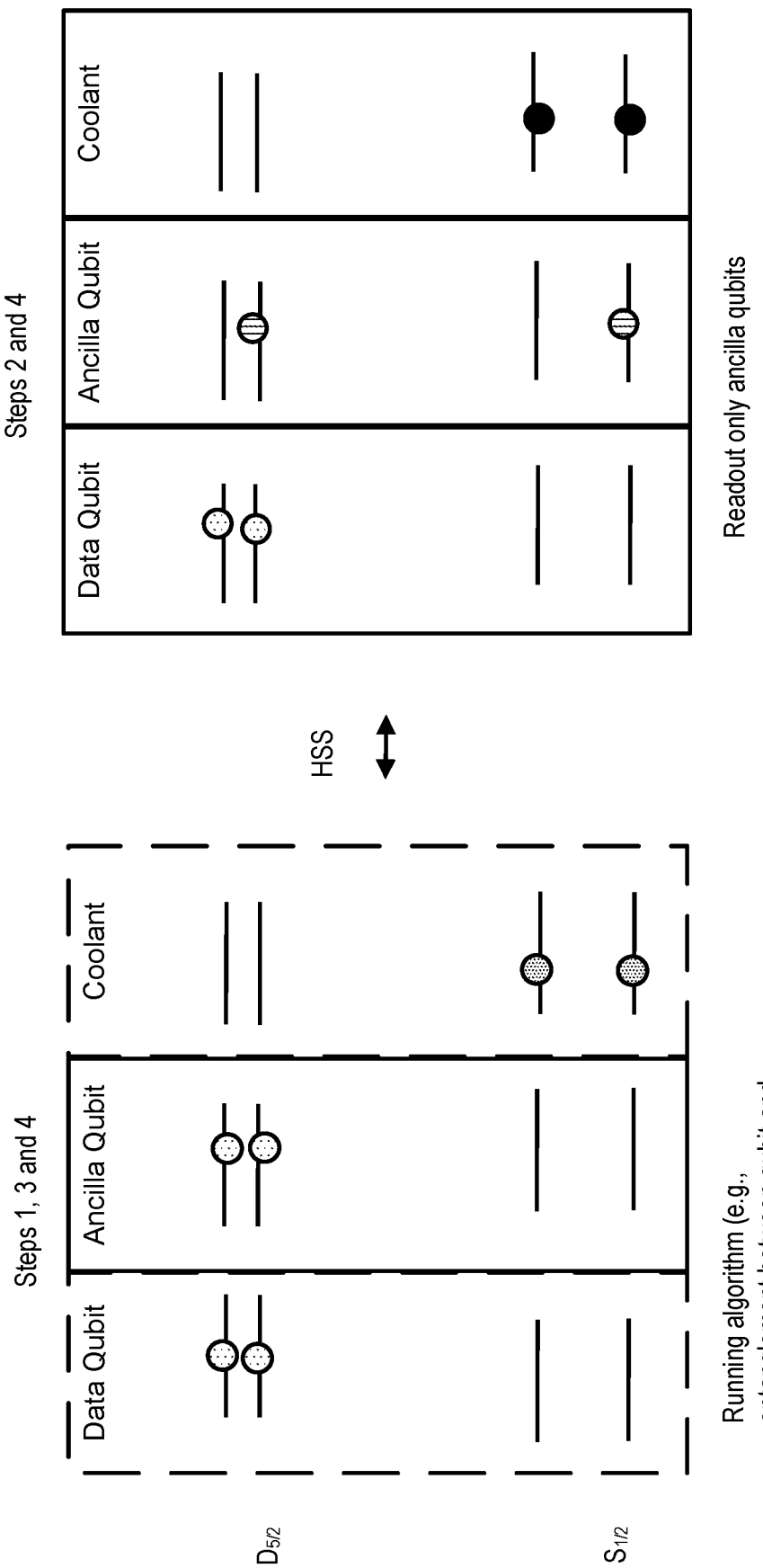
FIG. 12 illustrates a second class of features with m-type Raman related to qubits plus ancillas plus coolant ions in connection with aspects of this disclosure.

Two Classes of Features with M-Type Raman:
CLASS II—Qubits Plus Ancillae Plus Coolant Ions The second class of features with m-type Raman, CLASS II, is described in connection with FIG. 12. In connection with CLASS II the following scheme can be performed (as illustrated in FIG. 12):
(1) Perform partial algorithm with data qubits and ancillas in m-type.
(2) Transfer only ancillas to o-type and data to m-type via HSS and hi-fi readout of ancillas.
(3) Move ancilla qubits back to qubit manifold and continue circuit.
(4) Sympathetic cooling/calibration can also be interspersed at any time (Class A is a subset of B).

As before, Class II functions require more HSS than Class I, but both need ONLY local m- and g-type Raman and global HSS, cooling, and readout.

The use of CLASS II enables: (1) Mid-circuit partial readout of quantum register without physical shuttling, and (2) mid-circuit REG without physical shuttling.

Scheme for Nulling HSS Laser Phase Noise by
Driving Both HSS Transitions Simultaneously
(CLASS I Functions)

One source of error in this approach can be phase noise in the laser used to drive the HSS transition. This noise is technical but intrinsic; it can be reduced by locking the laser phase to a suitably stable reference, but it cannot be completely eliminated. In particular, this laser phase noise might impart phase noise onto our qubits every time a swap of the ancilla and qubit ions between the g and m manifolds takes place. For example, by driving the $|0>_g$ to $|0>_m$ HSS transition followed sequentially by the $|1>_g$ to $|1>_m$ transition (or vice versa), then any drift in the laser phase between the times of these two transitions is imprinted into a relative phase between $|0>_m$ and $|1>_m$, which enters into and degrades the fidelity of the calculation.

In other words, in performing the two HSS transitions sequentially, there is a brief storage of the qubit information in the optical qubit, when the qubit is divided between the g and m manifolds. During this time, any drift between the phases of the optical qubit and laser is imprinted on the qubit phase when the transfer is completed to the m manifold.

The techniques described herein can be used as a solution to the problem outlined above. The impact of laser phase noise on the qubit phase can be nulled by driving the $|0>_g$ to $|0>_m$ and $|1>_g$ to $|1>_m$ transitions simultaneously. The laser phase at the transition is common to both $|0>_m$ and $|1>_m$ and therefore does not introduce an erroneous phase into the calculation. In other words, the qubit information is at no time stored in the optical qubit, eliminating the opportunity for laser phase noise to be converted into qubit phase error.

If the laser phase noise is sufficiently large, it can cause imperfect transfer (i.e., the population in $|0>_g$ is not fully transferred to $|0>_m$), but, as elucidated elsewhere, this scheme is sufficiently general so as to enable to use BB1 or other pulse sequences, which are designed to optimize transfer even in the presence of experimental imperfections like phase noise. Further, an error of imperfect transfer, unlike an error of laser phase being imprinted onto the qubit, can be easily detected, in which case it is possible to choose to either reject the calculation result if it is impacted by the error or accept the calculation result if it is not.

This solution is particularly useful for the Class I functions in the scheme that does not use m-state Raman, wherein it always drives the two HSS transitions together in the midst of the calculation (i.e., not during initialization and readout). Therefore, this technique can eliminate the impact of laser phase noise on the qubit phase for algorithms that use only Class I functions.

Scheme for Nulling HSS Laser Phase Noise by
Performing an Echo Sequence (CLASS II
Functions)

The technique of driving the $|0>_g$ to $|0>_m$ and $|1>_g$ to $|1>_m$ transitions simultaneously to prevent laser phase noise from being imprinted on the qubit only works when no other operations need to be performed in between these two transitions. This is not the case for Class II transitions. For example, for ancilla readout, one HSS transition (either $|0>_g$ to $|0>_m$ or $|1>_g$ to $|1>_m$) is driven, then select out the ancilla ions to read out by applying a Raman pulse to those ions, and then drive the other HSS transition. Because the Raman transition inevitably has a finite duration, this sequence is susceptible to imprinting laser phase noise onto the qubit phase noise.

In other words, storing the qubit information in an optical qubit for a finite amount of time will be needed, creating the opportunity for laser phase noise to be converted into qubit phase error.

The techniques described herein can be used as a solution to the problem outlined above. For example, a technique called "spin echoing," which is common in the NMR and quantum information communities, can be adapted for use with the scheme/architecture described herein. The basic concept is that the phase noise in the laser is transferred to the qubit when the qubit information is imprinted on the optical qubit during the Raman pulse. To "echo out" this phase error, an echo pulse is applied to the optical qubit after the Raman pulse by driving the $|0>_g$ to $|0>_m$ and $|1>_g$ to $|1>_m$ transitions simultaneously, which has the effect of flipping the optical qubit. This causes the laser phase noise to be imprinted on the optical qubit with the opposite sign. There is a wait after the echo pulse for a period of time equal to the duration of the Raman pulse before completing the transition to the m manifold, so the errors imprinted before and after the echo pulse cancel each other. If the rate at which the laser phase drifts is constant, then this cancellation can, in principle, be perfect. This echo technique therefore eliminates the OMG scheme's susceptibility to a laser phase that drifts at a constant rate, rendering the scheme instead susceptible only to the change in the rate at which the laser phase drifts over the course of the echo sequence.

An additional level of echoing can be applied to further reduce the OMG's scheme's susceptibility to laser phase noise over the course of performing a Class II function. In the case of mid-circuit ancilla readout, it is possible to echo the phase noise as described above while separating out the readout ancillae from the other qubits. Also need to reverse this operation after performing the readout in order to fold the readout ancillae back into the qubit register. By applying additional echo pulses to this second operation, it is possible to null the scheme's susceptibility not only to a laser phase that drifts at a constant rate but also to a laser phase that drifts at a rate that is itself changing at a constant rate over the course of the entire readout operation. Essentially, the sequence of HSS transitions is driven in such a way that if, for example, the optical qubit acquired phase noise with a positive sign followed by a negative sign for the initial ancillae-separation sequence, it acquires phase error with a negative sign followed by a positive sign for the ancillae-refolding sequence. Therefore, not only are the ancillae-separation and ancillae-refolding sequences themselves individually echoed to cancel phase error acquired within each sequence, but they are constructed in such a way that the phase noise acquired during the ancillae-refolding sequence cancels that acquired during the ancillae-separation sequence.

Schemes for High-Fidelity HSS with a Global Beam

A problem that may arise is that for a laser beam of finite size globally addressing a long chain of ions from a direction that is not along the chain axis, there will be a limit to the fidelity of the pi-pulses due to inhomogeneity of the laser intensity over the chain. For example, a 32-ion chain with 3-micron ion spacing; global beam with 85-micron radius centered on chain, propagating normal to the chain axis gives pi-pulse fidelity of only 0.84 for the edge ions (1 and 32) if the laser intensity is chosen to drive a perfect pi-pulse on the center ion.

This disclosure provides two exemplary embodiments (e.g., exemplary schemes or aspects) that address the problem outlined above.

Scheme 1: Make the laser beam larger only in the direction along the chain axis (high-eccentricity elliptical beam). In the example above, make the beam radius 600 microns to get HSS error on outer ions to <1e−4. This will require 2.66× the time for the pi-pulse HSS transfer for the same laser power.

Scheme 2: Use a coherent quantum pulse sequence to minimize pi-pulse infidelity due to inhomogeneous laser intensity. One can use the BB1 sequence (e.g., http://cds.cern.ch/record/599468/files/0301019.pdf for a general outline of BB1) and the same (e.g., 85 micron) beam size (low-eccentricity elliptical beam). This can also achieve <1e−4 HSS errors but would take 1.9× longer than scheme.

Scheme 1 vs Scheme 2: Scheme 2 is better if it is undesirable to have a large beam for optical access reasons. Scheme 1 is better if one wants faster HSS transfer (for fixed laser power) or smaller required laser power (for fixed transfer time). Another advantage of Scheme 1 is that by not requiring BB1, pulse sequences can be used that are optimized for other kinds of transfer errors (e.g., frequency or phase noise).

Laser Scheme for High-Fidelity Dual-Space Operation

A laser scheme for high-fidelity dual-space operation is described in connection with FIG. 13. This laser beam scheme (propagation direction/polarizations/B-field orientation) is very well suited to high-fidelity dual-space operation.

Individual Raman configuration minimizes deleterious AC Stark shifts when using pulsed lasers.

Global HSS is typically driven by an atomic quadrupole transition. The HSS beam orientations shown in FIG. 13 maximize the transition rate. For long-wavelength HSS laser (e.g., 1762 nanometer (nm) for Ba+ ions), the small Lamb-Dicke parameter results in small HSS transfer errors (<1e−4) even for significant thermal population of axial modes (nbar=50) in a 32-ion chain.

The polarization of the HSS beam depends on the specific sattes in the m-state manifold that are used during the HSS sequence. For clock states (i.e., those with $m_F=0$), a polarization perpendicular to the magnetic field may be utilized to maximize the transition rate. However, there are other states (so-called "first-order field-insensitive" or "FOFI" states) that have nonzero values of $m_F$ but whose relative frequencies are insensitive to magnetic fields to first order. For these states, which have $|m_F|=1$, the transition rate is maximized by setting the polarization to lie in the plane defined by the direction of beam propagation and the magnetic field.

Scheme to Enable Simultaneous Driving of One or Two HSS Transitions Using an AOM and EOM There is a need to implement a technical solution that enables driving either (1) the $|0>_g$ to $|0>_m$ and $|1>_g$ to $|1>_m$ transitions simultaneously or (2) transition individually. Because these transitions can be separated in frequency by many GHz for many ion species, this may be technically challenging.

In an exemplary aspect, this is accomplished by using an electro-optic modulator (EOM) to apply two sets of sidebands so that one sideband from each set addressed each transition. These two sets of sidebands could then be turned on together or individually to drive one or both transitions. However, this would unavoidably divide the optical power between five tones (two in each set of sidebands plus the carrier), which would raise the power that is required from the optical system upstream of the EOM.

Alternatively, this is accomplished in an exemplary aspect by using an acousto-optic modulator (AOM) and EOM in series. The EOM would modulate the laser frequency to address the two transitions, one with the EOM carrier and one with one sideband. This reduces the amount of power that would be wasted since only one set of sidebands would need to be generated. However, since the power in the carrier cannot be nulled, the AOM is needed to modulate the overall power in the beam. For this approach, it would be easy to address both transitions and to address only the transition addressed by the EOM carrier by turning off the EOM sideband, but it would be difficult to address only the transition addressed by the EOM sideband. To accomplish this, the drive frequencies of both the EOM and AOM could be shifted by equal amounts to detune the carrier away from its transition but leave the carrier resonant with its transition. However, in this case, the finite bandwidth of the AOM, which is often limited to a few tens of MHz unless special measures are taken, would force us to balance off-resonant excitation of the unwanted transition versus the speed at which the transition is driven.

A solution to the problem outlined above is to use an AOM and EOM in sequence, as in the second scheme listed above, but with the extension of using independent control of the AOM and EOM phases to cancel excitation of the unwanted transition. The phase of the optical tone corresponding to the EOM carrier is given by the phase of the AOM drive phase alone, but the phase of the optical tone corresponding to the EOM sideband is given by the sum of the phases of the AOM and EOM drive tones. As described elsewhere, the BB1 and related composite pulse sequences consist of a nominal rotation pulse followed by some correction pulses whose rotation angles are fixed but whose phases depend on the nominal rotation angle. Halfway through the nominal rotation pulse, it is possible to change the phases of the AOM and EOM drive tones by pi. This results in the phase of the carrier optical tone changing by pi and the phase of the sideband optical tone changing by 2*pi, which is equivalent to its phase remaining unchanged. Thus, the sideband transition gets a nominal rotation angle of pi, and the carrier transition gets a nominal rotation angle of 0. Then the correction pulses are applied on both transitions, using the same technique with the AOM and EOM phases to give the correction pulses the proper phases for nominal angles of 0 and pi.

This scheme can be extended to the case where the strengths of the two HSS transitions are equal (i.e., the two transitions are driven at equal rates for a given optical power). In this case, the two transitions can be driven with the same set of EOM sidebands, which are intrinsically power-matched. This obviates the need to precisely calibrate the power of the optical powers of the EOM sidebands to match that of the EOM carrier. In this case, the phase of one optical tone is given by the sum of the phases of the AOM and EOM drives, and the phase of the other optical tone is given by their difference. Halfway through the nominal rotation pulse, it is possible to change the phase of the AOM drive by +pi/2 and the phase of the EOM drive by either +pi/2 or –pi/2. This results in the phase of one of the optical tones changing by pi and the phase of the other remaining unchanged. As above, one of the transitions gets a nominal rotation angle of pi, and the other gets a nominal rotation angle of 0. Then the correction pulses are applied on both transitions, again setting the phases of the AOM and EOM drive to give the correction pulses the proper phases for nominal angles of 0 and pi. This technique enables to drive either transition, and it is possible to drive both by not changing the phases of the AOM and EOM drives.

In general, the dual-space, single-species architecture for trapped-ion for quantum information processing described herein is flexible and has several advantages over architectures that rely on dual species. For example, a single chain of ions is reconfigurable as needed without physical shuttling. Also, sympathetic cooling can be perfectly mass-matched. It should be appreciated that the exemplary aspects herein do not require narrow line cooling, which itself may be a risk, and may not get as cold as (electromagnetically-induced-transparency) EIT cooling. This approach also enables mid-algorithm readout and remote entanglement generation (REG) on dipole-allowed (broad) transitions for high speed. Moreover, no mixed-species two-qubit (2q) gate for RE distribution.

The use of a global 1762 optical beam for dual-space, single-species architectures is already considered for shelving during readout. Only the short-wavelength Raman need be focused tightly for addressing. But for the approach using g-type gates (ground qubit gates), another independent tone may be needed 10 GHz away. This may be accomplished with a second laser and a high frequency acousto-optic modulator (AOM). AC Stark shifts of the m-type (metastable qubit), including from the ion trap RF, needs to be considered/managed. The global 1762 optical beam would also allow for integrated photonics down the road.

The dual-space, single-species architecture can also support m-type Raman operations, which can produce higher-fidelity and more efficient gates. Such an approach only needs the 1762 tones spaced by ~80 MHz (not 10 GHz) with local m-type and g-type Raman.

Figure 14:
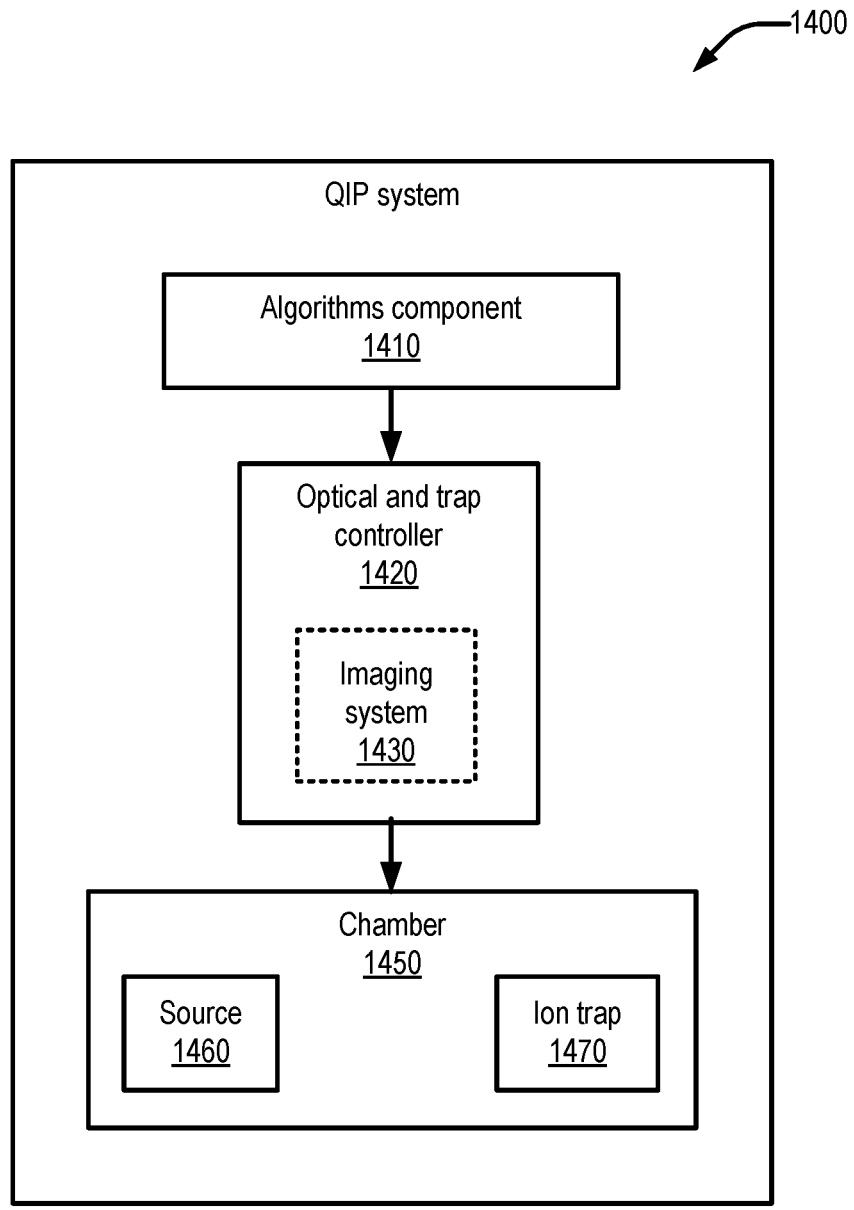
FIG. 14 illustrates an example of a quantum information processing (QIP) system in which a dual-space, single species architecture can be implemented according to aspects of the present disclosure.

FIG. 14 is a block diagram that illustrates an example of a QIP system 1400 in accordance with aspects of this disclosure in which the techniques described above for a dual-space, single species trapped-ion architecture can be implemented. The QIP system 1400 may also be referred to as a quantum computing system, a computer device, a trapped ion system, or the like.

The QIP system 1400 can include a source 1460 that provides atomic species (e.g., a plume or flux of neutral atoms) to a chamber 1450 having an ion trap 1470 that traps the atomic species once ionized (e.g., photoionized). The ion trap 1470 may be part of a processor or processing portion of the QIP system 1400. The source 1460 may be implemented separate from the chamber 1450.

The imaging system 1430 can include a high-resolution imager (e.g., CCD camera) for monitoring the atomic ions while they are being provided to the ion trap or after they have been provided to the ion trap 1470. In an aspect, the imaging system 1430 can be implemented separate from the optical and trap controller 1420, however, the use of fluorescence to detect, identify, and label atomic ions using image processing algorithms may need to be coordinated with the optical and trap controller 1420.

The QIP system 1400 may also include an algorithms component 1410 that may operate with other parts of the QIP system 1400 (not shown) to perform quantum algorithms or quantum operations, including a stack or sequence of combinations of single qubit operations and/or multi-qubit operations (e.g., two-qubit operations) as well as extended quantum computations. As such, the algorithms component 1410 may provide instructions to various components of the QIP system 1400 (e.g., to the optical and trap controller 1420) to enable the implementation of the quantum algorithms or quantum operations.

Figure 15:
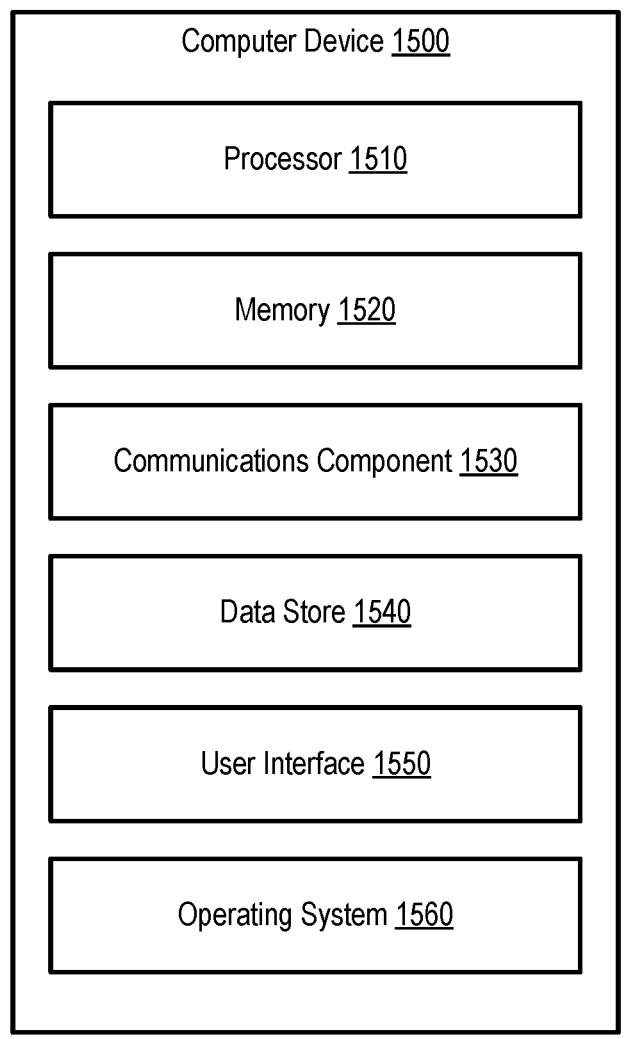
FIG. 15 illustrates an example of a computer device in which a dual-space, single species architecture can be implemented for quantum information processing according to aspects of the present disclosure.

Referring now to FIG. 15, illustrated is an example computer system or device 1500 in accordance with aspects of the disclosure. The computer device 1500 can represent a single computing device, multiple computing devices, or a distributed computing system, for example. The computer device 1500 may be configured as a quantum computer (e.g., a QIP system), a classical computer, or a combination of quantum and classical computing functions. For example, the computer device 1500 may be used to process information using quantum algorithms based on trapped ion technology and may therefore implement the dual-space, single species architecture described herein. A generic example of the computer device 1500 as a QIP system is illustrated in the QIP system 1400 shown in FIG. 14.

In one example, the computer device 1500 may include a processor 1510 for carrying out processing functions associated with one or more of the features described herein. The processor 1510 may include a single or multiple set of processors or multi-core processors. Moreover, the processor 1510 may be implemented as an integrated processing system and/or a distributed processing system. The processor 1510 may include a central processing unit (CPU), a quantum processing unit (QPU), a graphics processing unit (GPU), or combination of those types of processors. In one aspect, the processor 1510 may refer to a general processor of the computer device 1500, which may also include additional processors 1510 to perform more specific functions such as functions for individual beam control.

In an example, the computer device 1500 may include a memory 1520 for storing instructions executable by the processor 1510 for carrying out the functions described herein. In an implementation, for example, the memory 1520 may correspond to a computer-readable storage medium that stores code or instructions to perform one or more of the functions or operations described herein. Just like the processor 1510, the memory 1520 may refer to a general memory of the computer device 1500, which may also include additional memories 1520 to store instructions and/or data for more specific functions such as instructions and/or data for individual beam control.

Further, the computer device 1500 may include a communications component 1530 that provides for establishing and maintaining communications with one or more parties utilizing hardware, software, and services as described herein. The communications component 1530 may carry communications between components on the computer device 1500, as well as between the computer device 1500 and external devices, such as devices located across a communications network and/or devices serially or locally connected to computer device 1500. For example, the communications component 1530 may include one or more buses, and may further include transmit chain components and receive chain components associated with a transmitter and receiver, respectively, operable for interfacing with external devices.

Additionally, the computer device 1500 may include a data store 1540, which can be any suitable combination of hardware and/or software, which provides for mass storage of information, databases, and programs employed in connection with implementations described herein. For example, the data store 1540 may be a data repository for operating system 1560 (e.g., classical OS, or quantum OS). In one implementation, the data store 1540 may include the memory 1520.

The computer device 1500 may also include a user interface component 1550 operable to receive inputs from a user of the computer device 1500 and further operable to generate outputs for presentation to the user or to provide to a different system (directly or indirectly). The user interface component 1550 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 1550 may include one or more output devices, including but not limited to a display, a speaker, a haptic feedback mechanism, a printer, any other mechanism capable of presenting an output to a user, or any combination thereof.

In an implementation, the user interface component 1550 may transmit and/or receive messages corresponding to the operation of the operating system 1560. In addition, the processor 1510 may execute the operating system 1560 and/or applications or programs, and the memory 1520 or the data store 1540 may store them.

When the computer device 1500 is implemented as part of a cloud-based infrastructure solution, the user interface component 1550 may be used to allow a user of the cloud-based infrastructure solution to remotely interact with the computer device 1500.

In some aspect, the conventional dual-space single-species architecture, where all Raman operations may be performed in the S states, is expected to work well for single-chain operation. However, there may be a potential roadblock to scaling this technique to multi-chain operation with repeated cooling cycles. Aspects of the present disclosure includes a mitigation strategy using D-state Raman in Ba-137. Specifically, for the current approach (where Raman is performed in the S states), errors may accrue each time the qubits are shelved or deshelved. Assuming that the clock laser does not impart a phase error onto the qubits (which should be the case if simultaneous clock transitions are driven), there may be errors in the transfer from S to D. Importantly, these may be subspace leakage errors, which may be particularly difficult to correct with traditional quantum error-correction codes. If there is a per-ion clock transfer fidelity of 99.5%, that gives a success rate of 20% when executing an algorithm with 23 qubits and 3 cycles of sympathetic cooling plus initialization [$0.995^{((2*3+1)*23)}=0.2$]. This error may be detected fairly easily by reading out only the coolant ions at the end of the run, and throwing out bad runs and convert an algorithmic fidelity loss into a yield loss, but may start to become prohibitive quickly when scaling up to many tens of qubits.

The alternate form of dual-space single-species architectural implementation with D-state Raman may reduce the impact of clock-transition errors because the qubits do not need to be shelved and deshelved in order to perform sympathetic cooling or mid-circuit calibration with the coolant ions. However, the partial readout may still be needed to perform error correction. In another scheme, all qubits still need to be shelved and deshelved at least twice in order to perform partial readout, and the scheme may echo out the impact of the phase noise of the clock laser, which may require even more shelve-deshelve round trips. This will impose a minimum impact of the clock transfer error for each error correction cycle, which scales linearly with the number of qubits. This scheme may be an improvement over the S-state Raman scheme, but further improvements may be desirable.

Therefore, it may be desirable to further minimize the number of S-D round trips taken by the qubits, which is where the trap-door operation is implemented.

Figure 16:
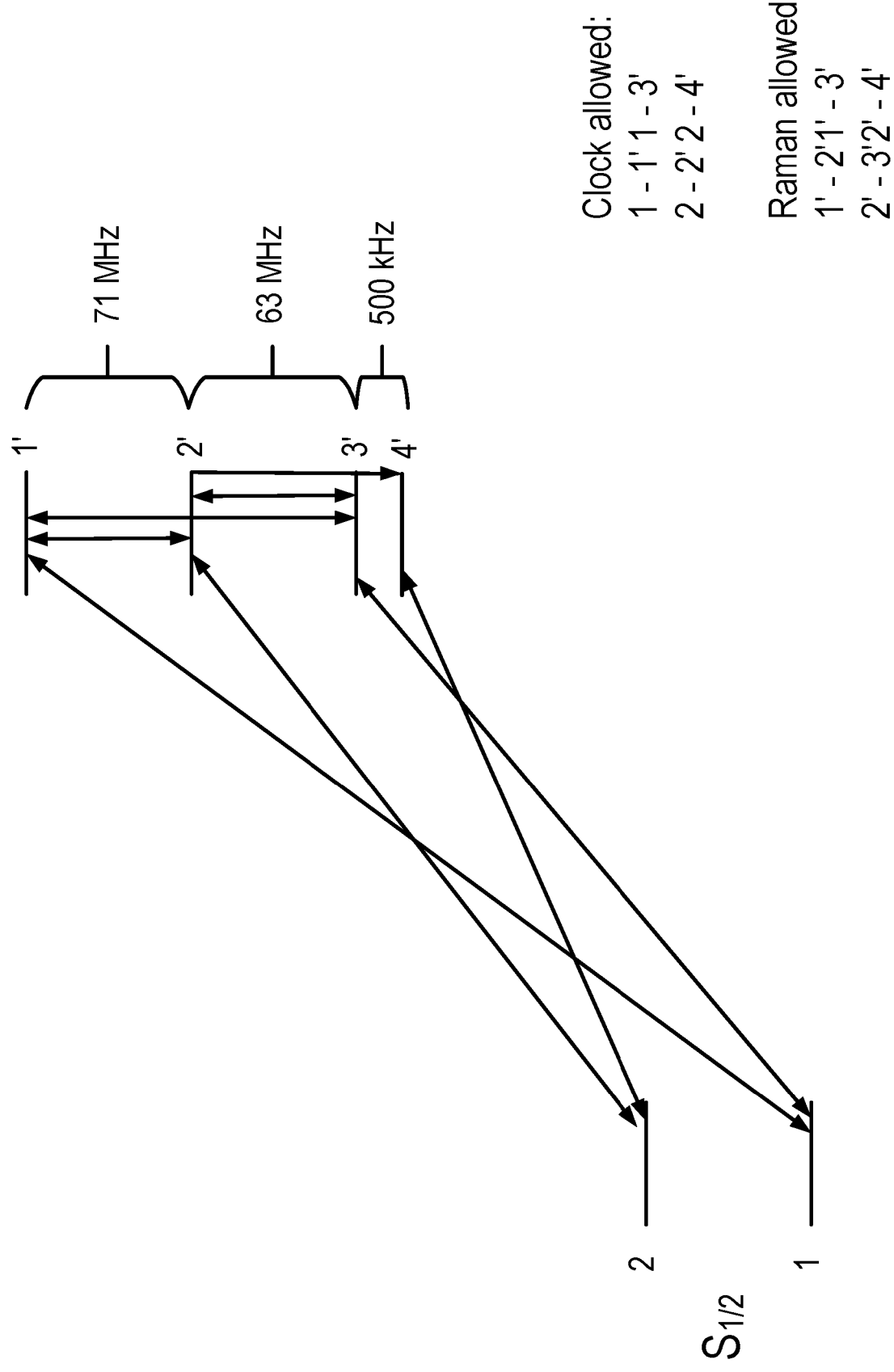
FIG. 16 illustrates an example of Ba-137 level structure with allowed transitions between the clock states in accordance with aspects of this disclosure.

FIG. 16 illustrates an example of Ba-137 level structure with allowed transitions between clock states according aspects of the present disclosure. Aspects of the present disclosure may relate to operations during computations of quantum circuits above. For example, the transitions shown in FIG. 16 may be used for the trap-door mid-circuit readout scheme and/or the trap-door loading scheme described below.

Aspects of the present disclosure may including performing Raman in the D states and working with clock states. For Ba-133, there may be two clock states in both the S and D manifolds. At least some of the states may be used as qubit states. In Ba-137, there may be a larger set of states and transitions as shown in FIG. 16. These concepts also apply if a set of states in the D manifold other than the clock states (e.g., first-order field-insensitive or FOFI states) are selected to be used as qubits.

In some aspects, 1' and 2' may be selected as the D-state qubit states because 3' and 4' are separated by approximately 500 kilohertz (kHz). The 3' and 4' states, though not used as qubit states, may be coupled to the D-state qubit states 1' and 2' by Raman transitions, and to the S-state qubit states 1 and 2 by clock transitions. Therefore, the 3' and 4' states may provide a "trap-door" out of the qubit subspace by which the population may be shuttled back and forth between S and D.

Figure 17:
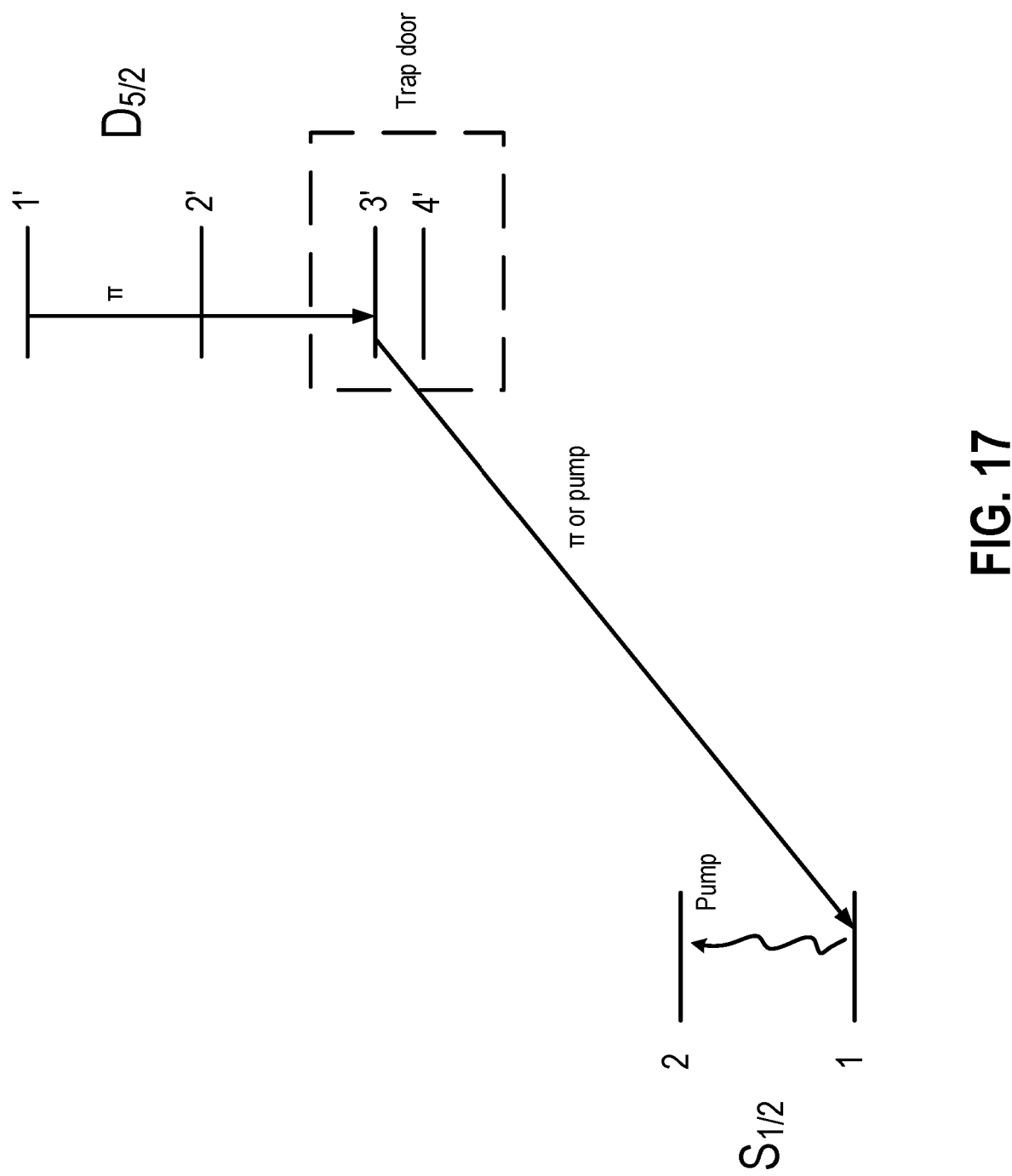
FIG. 17 illustrates an example of trap-door readout in accordance with aspects of this disclosure

FIG. 17 illustrates an example of trap-door mid-circuit readout. In some aspects, the scheme shown in FIG. 17 illustrates a technique for using the trap-door to perform a mid-circuit measurement. First, the ancilla ions are driven from 1' to 3' via Raman transitions. Next, the 1' component of the ancilla ions population state may be transferred from 3' to 1 in the S state. Because the ancilla ions may be separated from the qubit ions with individually-addressed Raman first, and then the global clock beam second, this sequence may allow for the transfer of only the ancilla ions to the S state. The qubit ions may not be driven in the clock transition, and therefore, they do not experience clock-related errors. The coolant ions in S may be pumped from the 1 manifold to the 2 manifold prior to starting the readout sequence.

According to aspects of the present disclosure, under the trap-door scheme, the qubits ions are not addressed with the clock laser, avoid the problem described above.

In some aspects, the qubit ions may be susceptible to clock transfer error when performing partial readout. However, the clock transfer error may be reduced by driving repeated clock pi pulses from 3' to 1 with optical pumping from 1 to 2 in between. Optical pumping in the S states may be bi-directional and may depend on the location of the carrier (e.g., 493 carrier). This method may ignore collecting population in the clock S states. Alternatively or additionally to repeated discrete clock and pump pulses, a weak clock drive may be applied and pump beam simultaneously, continuously pumping population from 3' to the 2 manifold. In some instances, the phase coherence in the ancilla ions may be negatively impacted. However, the projective measurement may allow the error-reduction methods described above.

In some instances, the error reduction techniques described herein may be used to readout the qubit ions at the end of the measurement. Specifically, the clock transition is to be driven from 1' to 1 directly without using the trap door. However, the error-reduction techniques of applying either repeated pulses or continuous drives may still be implemented.

Figure 18:
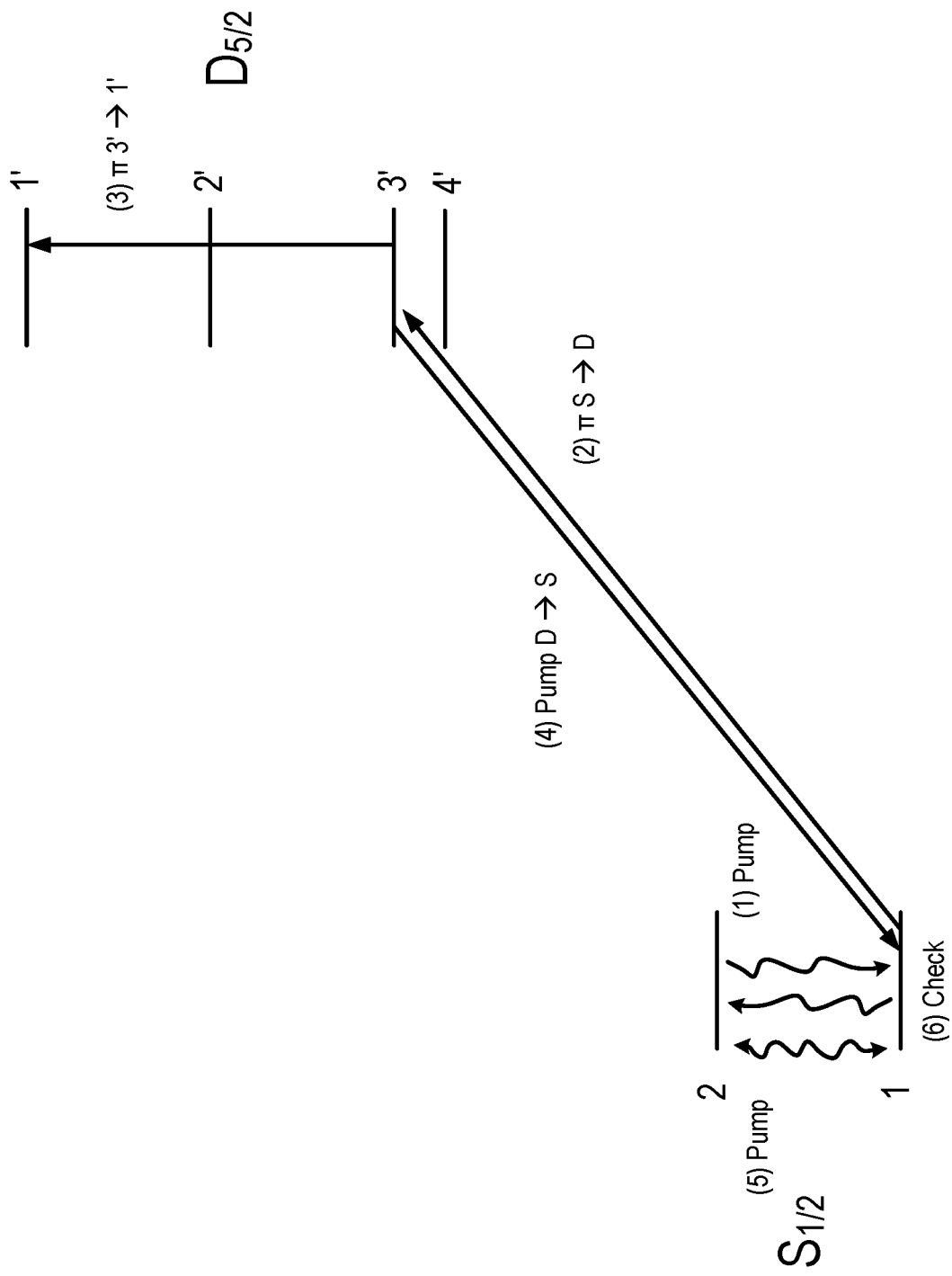
FIG. 18 illustrates an example of trap-door loading in accordance with aspects of this disclosure.

FIG. 18 illustrates an example of trap-door loading according aspects of the present disclosure. In some aspects, this technique may be implemented toward an end of the partial readout sequence to fold the ancilla ions back into the qubit array. In other aspects, this technique may be utilized at the beginning of the sequence to ensure efficient and verifiable preparation of qubit ions in 1'. In some implementations, at (1), one or more ions may be pumped to 1. Next, at (2), a partial clock transition drives the one or more ions to 3'. The partial clock transition may transfer a first portion of the qubit ions population from one state to another. A second portion of the population that remains in the initial state may constitute an error. At (3), one or more Raman pulses are used to transfer the qubit ions to 1'. Next, at (4) and (5), the ions in 3' are flushed back to S using a high fidelity pumping method described above. At (6), both the 1 and 2 manifolds are illuminated to check that only the coolant ions have been pumped to S. If any qubit ion has failed to initialize into 1', the sequence may be run again, applying the Raman pulses only to the qubit ions that were not successfully initialized previously. The dynamic method (i.e., making a second attempt a initializing only those ions that failed on the first attempt), may be more scalable than other methods of trying to initialize the entire register until all qubit ions are successfully initialized in the same attempt.

Figure 13:
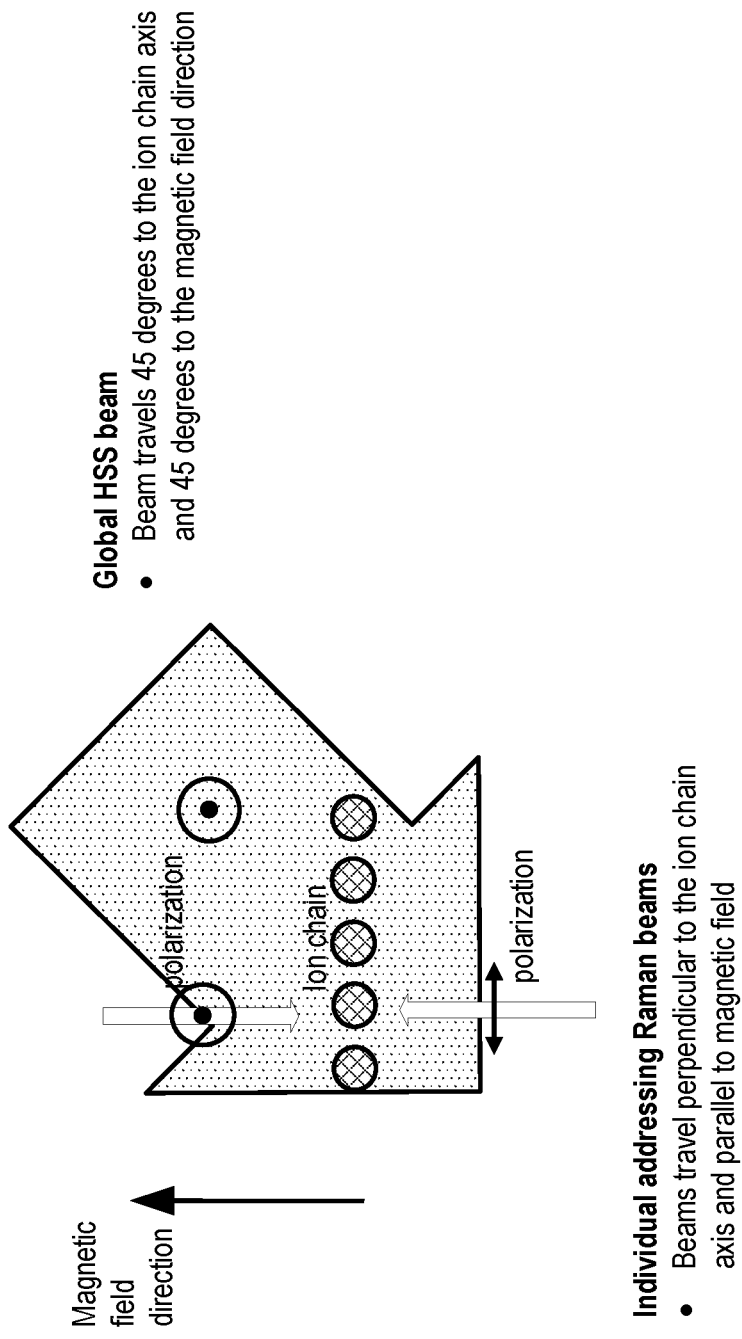
FIG. 13 illustrates a laser scheme for high-fidelity dual-space operation in connection with aspects of this disclosure.
Figure 19:
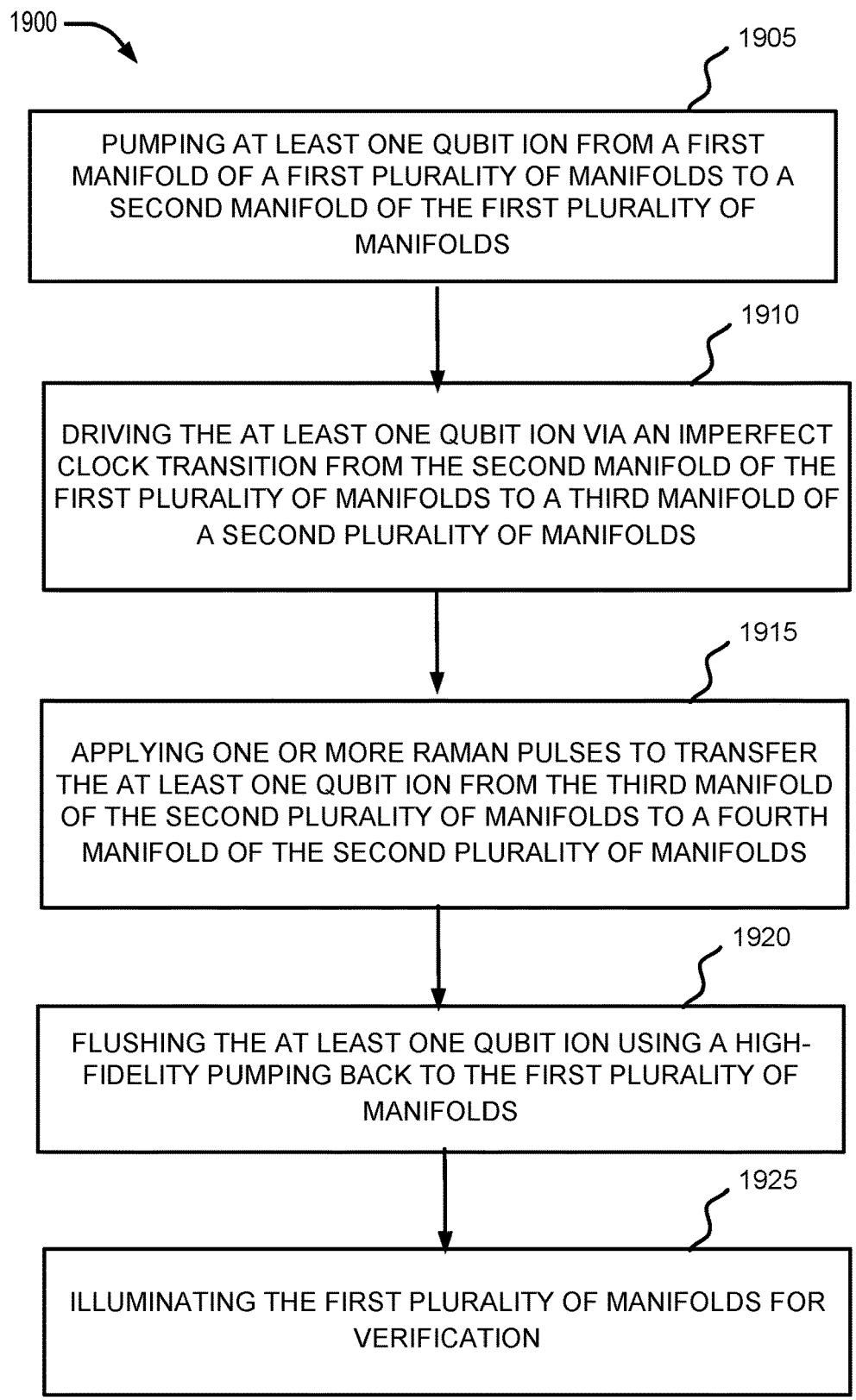
FIG. 19 illustrates an example of a method for preparing barium 137 ions according to aspects of the present disclosure.

Turning to FIG. 19, a method 1900 of trap-loading may be performed by the laser scheme of FIG. 13, the QIP system 1400, subcomponents of the QIP system 1400, the computer device 1500, and/or subcomponents of the computer device 1500.

At block 1905, the method 1900 may pump at least one qubit ion from a first manifold of a first plurality of manifolds to a second manifold of the first plurality of manifolds. For example, the QIP system 1400 may utilize one or more optical beams of the laser scheme to pump at least one qubit ion from the 2 manifold of the $S_{1/2}$ manifold to the 1 manifold of the $S_{1/2}$ manifold.

At block 1910, the method 1900 may drive the at least one qubit ion via a partial clock transition from the second manifold of the first plurality of manifolds to a third manifold of a second plurality of manifolds. For example, the QIP system 1400 may utilize one or more optical beams of the laser scheme to drive the at least one qubit ion via a partial clock transition from the 1 manifold of the $S_{1/2}$ manifold to the 3' manifold of the $D_{5/2}$ manifold.

At block 1915, the method 1900 may apply one or more Raman pulses to transfer the at least one qubit ion from the third manifold of the second plurality of manifolds to a fourth manifold of the second plurality of manifolds. For example, the QIP system 1400 may apply one or more Raman pulses of the laser scheme to transfer the at least one qubit ion from the 3' manifold to the 1' manifold of the $D_{5/2}$ manifold.

At block 1920, the method 1900 may flush the at least one qubit ion using a high-fidelity pumping back to the first plurality of manifolds. For example, the QIP system 1400 may utilize one or more optical beams of the laser scheme to flush the at least one qubit ion using a high-fidelity pumping back to 2 manifold of the $S_{1/2}$ manifold.

At block 1925, the method 1900 may illuminate the first plurality of manifolds for verification. For example, the QIP system 1400 may utilize one or more optical beams of the laser scheme to illuminate the 2 manifold to check that only the coolant ions have been pumped to the $S_{1/2}$ manifold.

Aspects of the present disclosure may include a method and/or a system for trap-door loading including pumping at least one qubit ion from a first manifold of a first plurality of manifolds to a second manifold of the first plurality of manifolds, drive the at least one qubit ion via a partial clock transition from the second manifold of the first plurality of manifolds to a third manifold of a second plurality of manifolds, applying one or more Raman pulses to transfer the at least one qubit ion from the third manifold of the second plurality of manifolds to a fourth manifold of the second plurality of manifolds, flushing the at least one qubit ion using a high-fidelity pumping back to the first plurality of manifolds, and illuminating the first plurality of manifolds for verification.

Aspects of the present disclosure include the method and/or system above, wherein flushing the at least one qubit ion comprises pumping the at least one qubit ion from the third manifold of the second plurality of manifolds to the second manifold of the first plurality of manifolds and pumping the at least one qubit ion from the second manifold of the first plurality of manifolds to the first manifold of the first plurality of manifolds.

Aspects of the present disclosure include any of the methods and/or systems above, wherein the first plurality of manifolds is associated with a $S_{1/2}$ manifold and the second plurality of manifolds is associated with a $D_{5/2}$ manifold.

Aspects of the present disclosure include any of the methods and/or systems above, further comprising applying one or more additional Raman pulses to initialize one or more qubit ions of the at least one qubit ion that failed to initialize during the application of the one or more Raman pulses.

Aspects of the present disclosure include any of the methods and/or systems above, further comprising, prior to pumping the at least one qubit from the first manifold or after illuminating the first plurality of manifolds, applying one or more second Raman pulses to transfer at least one ancilla ion from the fourth manifold of the second plurality of manifolds to the third manifold of the second plurality of manifolds, transferring the at least one ancilla ion from the third manifold of the second plurality of manifolds to the second manifold of the first plurality of manifolds, and applying one or more of an individual Raman beam or a global beam to separate the at least one ancilla ion from the at least one qubit ion.

Aspects of the present disclosure include any of the methods and/or systems above, further comprising, prior to applying the one or more second Raman pulses, pumping at least one coolant ion from the second manifold of the first plurality of manifolds to the first manifold of the first plurality of manifolds Aspects of the present disclosure include any of the method and/or system above, wherein applying the global optical beam comprises applying a single laser beam having an eccentricity in a direction along the plurality of DSSS trapped ions such that the single laser beam covers the plurality of DSSS trapped ions.

Aspects of the present disclosure include any of the method and/or system above, wherein applying the global optical beam comprises applying the global optical beam at a first 45-degree angle with respect to the plurality of DSSS trapped ions and a second 45-degree angle with respect to a magnetic field.

Aspects of the present disclosure include any of the method and/or system above, further comprising adjusting a frequency of the at least one Raman beam of the plurality of Raman beams using an electro-optic modulator (EOM) or an acousto-optic modulator (AOM) disposed in series with an EOM.

Aspects of the present disclosure include any of the method and/or system above, further comprising applying a cooling Raman beam of the plurality of Raman beams to at least a cooling ion of the plurality of DSSS trapped ions to transition the cooling ion from a first state to a second state that is higher than the first state.

Aspects of the present disclosure include any of the method and/or system above, further comprising reading an ancilla ion of the plurality of DSSS trapped ions associated with the DS SS trapped ion during a computation of the qubit.

Aspects of the present disclosure include any of the method and/or system above, further comprising calibrating the DSSS trapped ion based on the reading of the ancilla ion during the computation of the qubit.

Aspects of the present disclosure include any of the method and/or system above, further comprising performing remote entanglement generation between the plurality of DSSS trapped ions and one or more remote DSSS trapped ions.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method for trap-door loading in a quantum information processing (QIP) system, comprising:
    pumping at least one qubit ion from a first manifold of a first plurality of manifolds to a second manifold of the first plurality of manifolds;
    driving the at least one qubit ion via a partial clock transition from the second manifold of the first plurality of manifolds to a third manifold of a second plurality of manifolds;
    applying one or more Raman pulses to transfer the at least one qubit ion from the third manifold of the second plurality of manifolds to a fourth manifold of the second plurality of manifolds;
    flushing the at least one qubit ion using a high-fidelity pumping back to the first plurality of manifolds; and
    illuminating the first plurality of manifolds for verification.

2. The method of claim 1, wherein flushing the at least one qubit ion comprises:
    pumping the at least one qubit ion from the third manifold of the second plurality of manifolds to the second manifold of the first plurality of manifolds; and
    pumping the at least one qubit ion from the second manifold of the first plurality of manifolds to the first manifold of the first plurality of manifolds.

3. The method of claim 2, further comprising repeating the flushing the at least one qubit ion at least one time.

4. The method of claim 1, wherein:
    the first plurality of manifolds is associated with a $S_{1/2}$ manifold; and
    the second plurality of manifolds is associated with a $D_{5/2}$ manifold.

5. The method of claim 1, further comprising applying one or more additional Raman pulses to initialize one or more qubit ions of the at least one qubit ion that failed to initialize during the application of the one or more Raman pulses.

6. The method of claim 1, further comprising, prior to pumping the at least one qubit from the first manifold or after illuminating the first plurality of manifolds:
    applying one or more second Raman pulses to transfer at least one ancilla ion from the fourth manifold of the second plurality of manifolds to the third manifold of the second plurality of manifolds;
    transferring the at least one ancilla ion from the third manifold of the second plurality of manifolds to the second manifold of the first plurality of manifolds; and
    applying one or more of an individual Raman beam or a global beam to separate the at least one ancilla ion from the at least one qubit ion.

7. The method of claim 6, further comprising, prior to applying the one or more second Raman pulses, pumping at least one coolant ion from the second manifold of the first plurality of manifolds to the first manifold of the first plurality of manifolds.

8. A non-transitory computer readable medium having instructions stored therein that, when executed by one or more processors of a quantum information processing (QIP) system, cause the one or more processors to:
- cause a first light source to pump at least one qubit ion from a first manifold of a first plurality of manifolds to a second manifold of the first plurality of manifolds;
- cause a second light source to drive the at least one qubit ion via a partial clock transition from the second manifold of the first plurality of manifolds to a third manifold of a second plurality of manifolds;
- cause a third light source to apply one or more Raman pulses to transfer the at least one qubit ion from the third manifold of the second plurality of manifolds to a fourth manifold of the second plurality of manifolds;
- cause a fourth light source to flush the at least one qubit ion using a high-fidelity pumping back to the first plurality of manifolds; and
- cause a fifth light source to illuminate the first plurality of manifolds for verification.

9. The non-transitory computer readable medium of claim 8, wherein the instructions for flushing the at least one qubit ion comprises instructions for:
- pumping the at least one qubit ion from the third manifold of the second plurality of manifolds to the second manifold of the first plurality of manifolds; and
- pumping the at least one qubit ion from the second manifold of the first plurality of manifolds to the first manifold of the first plurality of manifolds.

10. The non-transitory computer readable medium of claim 9, further comprising instructions for repeating the flushing the at least one qubit ion.

11. The non-transitory computer readable medium of claim 8, wherein:
- the first plurality of manifolds is associated with a $S_{1/2}$ manifold; and
- the second plurality of manifolds is associated with a $D_{5/2}$ manifold.

12. The non-transitory computer readable medium of claim 8, further comprising instructions for applying one or more additional Raman pulses to initialize one or more qubit ions of the at least one qubit ion that failed to initialize during the application of the one or more Raman pulses.

13. The non-transitory computer readable medium of claim 8, further comprising instructions for, prior to pumping the at least one qubit from the first manifold or after illuminating the first plurality of manifolds:
- applying one or more second Raman pulses to transfer at least one ancilla ion from the fourth manifold of the second plurality of manifolds to the third manifold of the second plurality of manifolds;
- transferring the at least one ancilla ion from the third manifold of the second plurality of manifolds to the second manifold of the first plurality of manifolds; and
- applying one or more of an individual Raman beam or a global beam to separate the at least one ancilla ion from the at least one qubit ion.

14. The non-transitory computer readable medium of claim 13, further comprising instructions for, prior to applying the one or more second Raman pulses, pumping at least one coolant ion from the second manifold of the first plurality of manifolds to the first manifold of the first plurality of manifolds.

15. A quantum information processing (QIP) system, comprising:
- a laser scheme including a plurality of light sources and configured to apply at least one of the plurality of light sources to a plurality of ions in the QIP system; and
- a controller configured to execute instructions in a memory to:
  - cause a first light source of the plurality of light sources to pump at least one qubit ion from a first manifold of a first plurality of manifolds to a second manifold of the first plurality of manifolds;
  - cause a second light source of the plurality of light sources to drive the at least one qubit ion via a partial clock transition from the second manifold of the first plurality of manifolds to a third manifold of a second plurality of manifolds;
  - cause a third light source of the plurality of light sources to apply one or more Raman pulses to transfer the at least one qubit ion from the third manifold of the second plurality of manifolds to a fourth manifold of the second plurality of manifolds;
  - cause a fourth light source of the plurality of light sources to flush the at least one qubit ion using a high-fidelity pumping back to the first plurality of manifolds; and
  - cause a fifth light source of the plurality of light sources to illuminate the first plurality of manifolds for verification.

16. The QIP system of claim 15, wherein the controller is further configured to:
- pump the at least one qubit ion from the third manifold of the second plurality of manifolds to the second manifold of the first plurality of manifolds; and
- pump the at least one qubit ion from the second manifold of the first plurality of manifolds to the first manifold of the first plurality of manifolds.

17. The QIP system of claim 15, wherein:
- the first plurality of manifolds is associated with a $S_{1/2}$ manifold; and
- the second plurality of manifolds is associated with a $D_{5/2}$ manifold.

18. The QIP system of claim 15, wherein the controller is further configured to apply one or more additional Raman pulses to initialize one or more qubit ions of the at least one qubit ion that failed to initialize during the application of the one or more Raman pulses.

19. The QIP system of claim 15, wherein the controller is further configured to, prior to pumping the at least one qubit from the first manifold or after illuminating the first plurality of manifolds:
- apply one or more second Raman pulses to transfer at least one ancilla ion from the fourth manifold of the second plurality of manifolds to the third manifold of the second plurality of manifolds;
- transfer the at least one ancilla ion from the third manifold of the second plurality of manifolds to the second manifold of the first plurality of manifolds; and
- apply one or more of an individual Raman beam or a global beam to separate the at least one ancilla ion from the at least one qubit ion.

20. The QIP system of claim 19, wherein the controller is further configured to, prior to applying the one or more second Raman pulses, pump at least one coolant ion from the second manifold of the first plurality of manifolds to the first manifold of the first plurality of manifolds.

* * * * *